United States Patent
Senarath et al.

(10) Patent No.: US 10,271,186 B2
(45) Date of Patent: Apr. 23, 2019

(54) METHOD AND APPARATUS FOR CHARGING OPERATIONS IN A COMMUNICATION NETWORK SUPPORTING SERVICE SESSIONS FOR DIRECT END USERS

(71) Applicants: Nimal Gamini Senarath, Ottawa (CA); Hang Zhang, Nepean (CA)

(72) Inventors: Nimal Gamini Senarath, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/880,207

(22) Filed: Jan. 25, 2018

(65) Prior Publication Data
US 2018/0220277 A1    Aug. 2, 2018

Related U.S. Application Data

(60) Provisional application No. 62/451,493, filed on Jan. 27, 2017, provisional application No. 62/451,401, filed on Jan. 27, 2017.

(51) Int. Cl.
| | |
|---|---|
| *H04M 11/00* | (2006.01) |
| *H04W 4/24* | (2018.01) |
| *H04M 15/00* | (2006.01) |

(52) U.S. Cl.
CPC ............ *H04W 4/24* (2013.01); *H04M 15/59* (2013.01); *H04M 15/8016* (2013.01); *H04M 15/8027* (2013.01)

(58) Field of Classification Search
CPC ....... H04L 12/891; H04L 12/24; H04L 29/08; H04L 47/41; H04L 67/1074; H04L 41/14; H04L 47/20; H04L 65/1069; G06F 15/173; G06F 15/16; G06Q 30/00; G06Q 30/02; G06Q 30/04; H04W 28/16; H04W 4/24; H04M 15/00; H04M 15/8016; H04M 15/81; H04M 15/66; H04M 15/8027
USPC .............................................. 455/406; 705/34
See application file for complete search history.

(56) References Cited

U.S. PATENT DOCUMENTS

| | | | | |
|---|---|---|---|---|
| 7,849,173 | B1 * | 12/2010 | Uhlik | ...................... H04L 12/14 709/223 |
| 2002/0152319 | A1 * | 10/2002 | Amin | ...................... H04L 29/06 709/232 |
| 2009/0205046 | A1 * | 8/2009 | Radosavac | ............ H04L 63/105 726/23 |
| 2011/0276447 | A1 | 11/2011 | Paul et al. | |

(Continued)

FOREIGN PATENT DOCUMENTS

| | | |
|---|---|---|
| EP | 2993820 A1 | 3/2016 |
| WO | 2016192640 A1 | 12/2016 |

*Primary Examiner* — Mahendra Patel

(57) ABSTRACT

Methods and apparatus for supporting customer charging in 5G networks are provided. Monitoring functions are instantiated at selected network locations for tracking access to network services. The monitoring functions provide charging information for use in customer billing. A customer can enter a service level agreement with a particular customized method of charging for service usage, and the monitoring functions can be customized to provide charging information according to the service level agreement. Charging can vary based on factors such as time of day, network congestion, service traffic characteristics, and geographic location.

22 Claims, 17 Drawing Sheets

(56) References Cited

U.S. PATENT DOCUMENTS

| | | | |
|---|---|---|---|
| 2012/0233302 A1 | 9/2012 | Kallin et al. | |
| 2013/0007232 A1* | 1/2013 | Wang | H04L 63/0272 |
| | | | 709/222 |
| 2013/0303114 A1* | 11/2013 | Ahmad | H04W 16/14 |
| | | | 455/406 |
| 2014/0016464 A1* | 1/2014 | Shirazipour | H04L 47/11 |
| | | | 370/235 |
| 2014/0269295 A1* | 9/2014 | Anumala | H04L 41/08 |
| | | | 370/235 |
| 2014/0362700 A1* | 12/2014 | Zhang | H04W 24/02 |
| | | | 370/235 |
| 2016/0156513 A1 | 6/2016 | Zhang et al. | |
| 2016/0352645 A1* | 12/2016 | Senarath | H04L 47/41 |
| 2016/0352924 A1* | 12/2016 | Senarath | H04M 15/8016 |
| 2016/0353268 A1* | 12/2016 | Senarath | H04W 4/24 |
| 2016/0353422 A1 | 12/2016 | Vrzic et al. | |
| 2018/0287891 A1* | 10/2018 | Shaw | H04L 41/5051 |
| 2018/0352501 A1* | 12/2018 | Zhang | H04W 48/14 |

\* cited by examiner

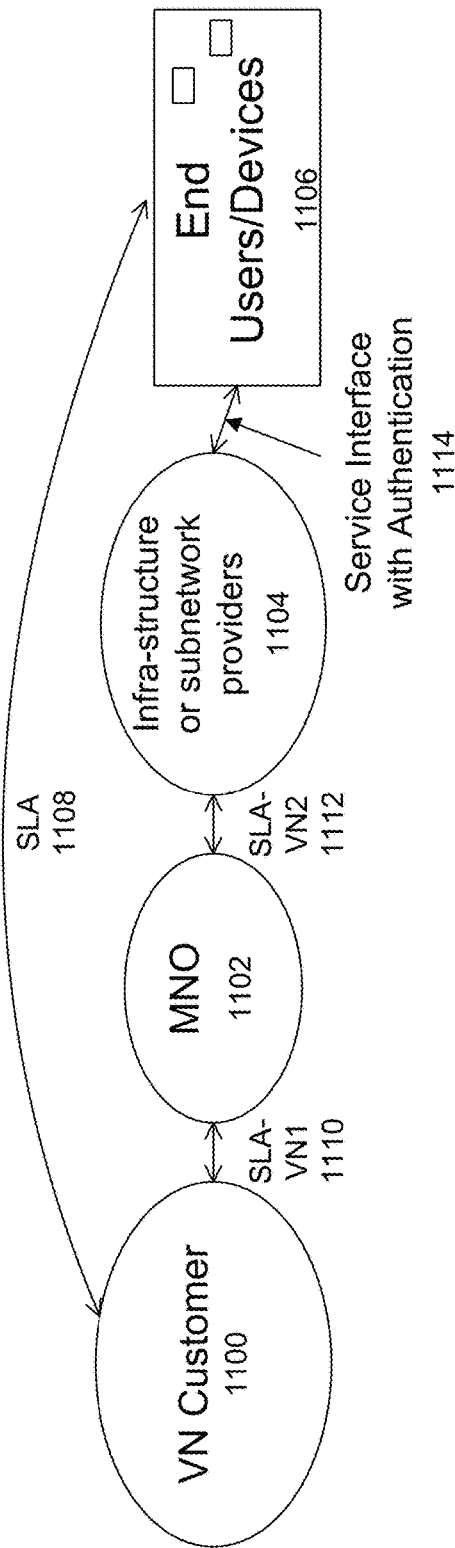
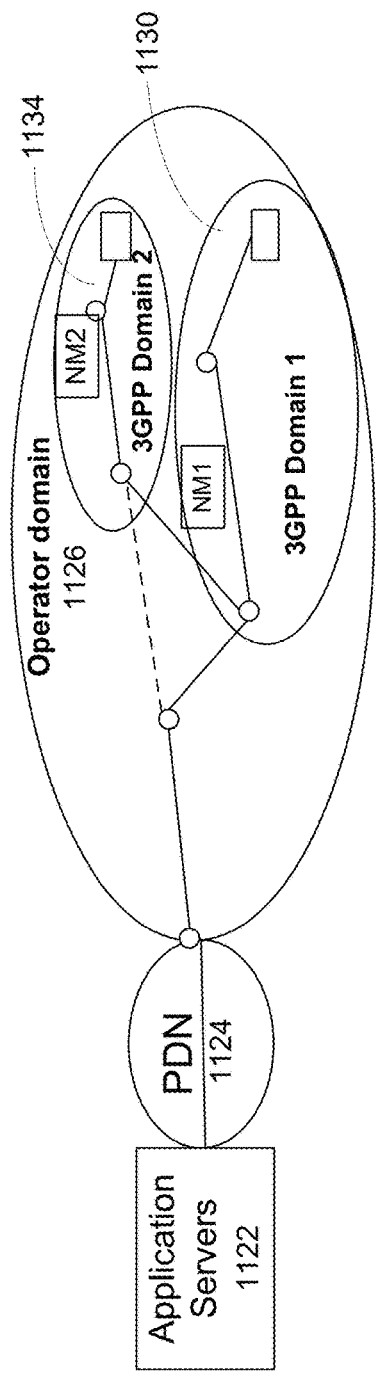
FIG. 2A
FIG. 2B

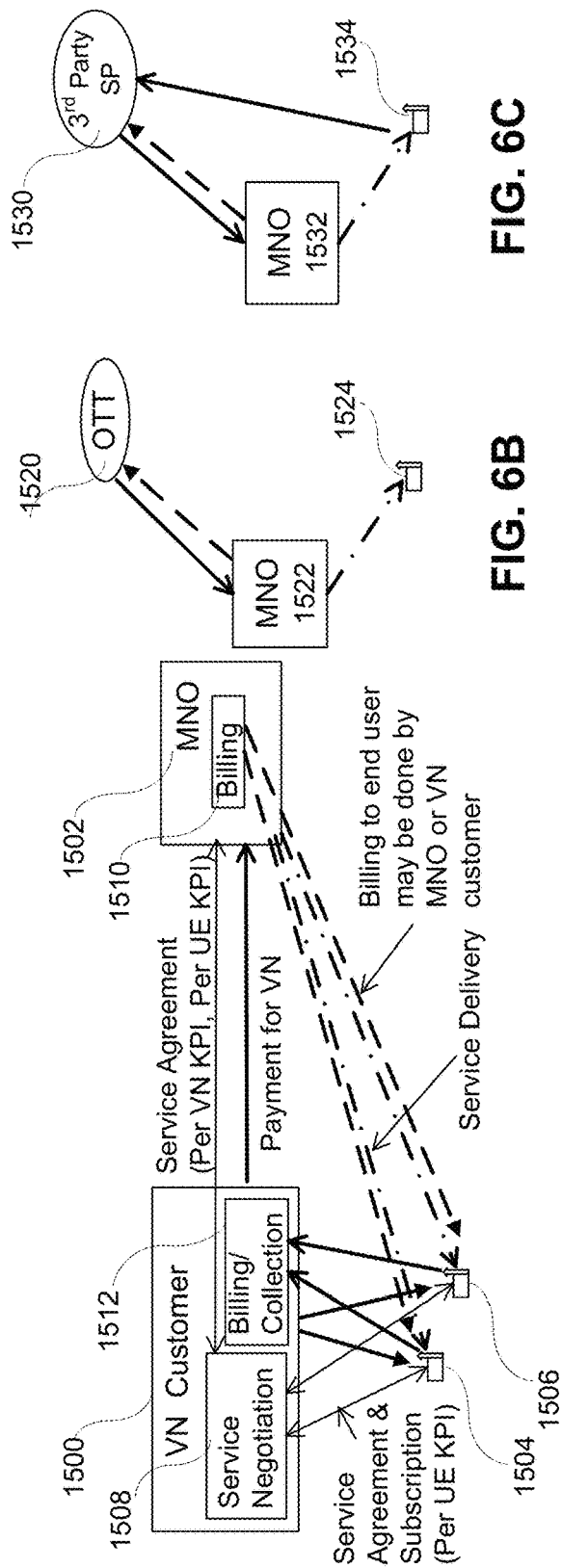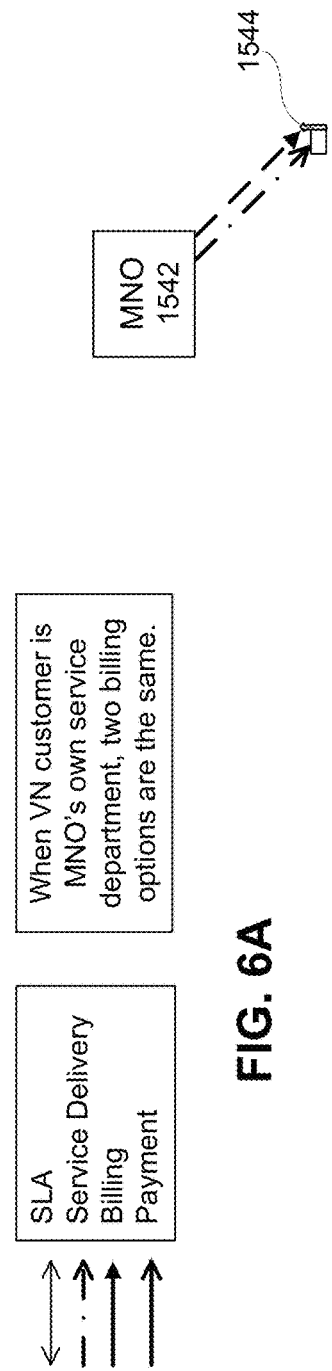
FIG. 6C
FIG. 6D
FIG. 6B
FIG. 6A

METHOD AND APPARATUS FOR CHARGING OPERATIONS IN A COMMUNICATION NETWORK SUPPORTING SERVICE SESSIONS FOR DIRECT END USERS

CROSS-REFERENCE TO RELATED APPLICATIONS

The present application claims priority from U.S. Provisional Patent Application No. 62/451,401 filed on Jan. 27, 2017, and U.S. Provisional Patent Application No. 62/451,493, filed on Jan. 27, 2017, both of which are incorporated herein by reference in their entirety.

FIELD OF THE INVENTION

The present invention pertains to the field of communication networks and in particular to a method and apparatus for charging operations in a host communication network. This may be a network supporting service sessions for direct end users.

BACKGROUND

Existing wireless and mobile networks such as third-generation (3G) and fourth-generation (4G) networks typically address usage based charging by tracking data traffic on a per-user equipment (UE) basis. This collected charging information can then be sent to an accounting system (typically within a management plane, or within an Operation Support Subsystem (OSS)/Business Support Subsystem (BSS)). Typically UE data consumption is charged according to a static set of charging rules. Typically a Mobile Network Operator (MNO), or a Mobile Virtual Network Operator (MVNO) track subscriber data consumption, and then apply billing rules in the OSS/BSS. These billing rules may include a fixed data allocation to be associated with a monthly subscription and charges for overages, a per bit/byte/megabyte (etc.) charge for all data consumed, etc. There may be times of day in which consuming network resources is discounted across the network (e.g. free phone calls or a reduced rate for data consumption during evenings and weekends).

In next generation mobile networks (e.g. so-called Fifth-generation (5G) networks), new network architectures and services to be offered are expected to differ in a variety of ways from previous generations of mobile networks. For example, 5G networks may utilize technologies such as network slicing and network function virtualization to dynamically provide customized virtual networks. A Network Operator in a 5G deployment may not be the entity that has a billing relationship with the subscribers, and it may not necessarily own the infrastructure through which a device such as an electronic device, mobile device or UE (terms that will be largely used interchangeably) connects. Particular end user groups may also commission and use customized virtual networks for their own members. The network operator providing the network services to such a virtual network may provide the services for a fee.

The document "3GPP TS 32.101; Technical Specification; 3rd Generation Partnership Project; Technical Specification Group Services and System Aspects; Telecommunication management; Principles and high level requirements," Release 13, V13.0.0, January 2016, establishes and defines the management principles and high-level requirements for the management of public land mobile networks (PLMNs). FIG. 1, which is a reproduction of FIG. 6.1 of the above-mentioned 3GPP document, illustrates an operational process model based on the Enhanced Telecom Operations Map®. The document identifies a need for automated processes to support the illustrated vertical end-to-end, customer operations processes of fulfillment, assurance, and billing, as well as operations support and readiness processes. However, billing processes have not been developed which adequately address the particular needs of new network architectures and new service providers.

Accordingly, it may be desirable to develop charging methods and systems which are appropriate to the capabilities and services of next generation mobile networks. Therefore there may be a need for a method and apparatus for charging operations in a communication network that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for charging operations in a communication network, such as a 5G network. In accordance with embodiments of the present invention, there is provided a method for collecting charging information associated with a customer for use of a service offered using a network slice in a communication network, the method comprising: instantiating a monitoring function at a location in the communication network, the location selected to allow monitoring or tracking of traffic flows associated with a UE that is using the service offered to the customer, and terminating within the communications network, the monitoring function configured to monitor said traffic flows and to provide indications of the traffic flows; and providing charging information for use in billing the customer based on the indications of the traffic flows. The method may further comprise providing a session of the service to one or more direct end devices associated with the customer, the session provided in response to an indicated demand.

In accordance with embodiments of the present invention, there is provided a method for collecting network usage information. The method includes instantiating a monitoring function at a location in a communication network. The location is selected to allow monitoring of traffic flows associated with usage, by a UE, of a network slice instantiated in the network. The monitoring function is configured to monitor the traffic flows. The UE uses the network slice for accessing an on-demand service. The method also includes generating, by the monitoring function, network slice usage information based on the traffic flows. The method also includes charging a designated payment entity for usage of the on-demand service by the UE, based on the network slice usage information.

In some embodiments, a customer entity responsible for the UE does not have a prior contractual relationship with a provider of the on-demand service. Access can be subject to authentication of the UE's credentials and payment information. The designated payment entity can be a third party such as a credit card service, or a provider of the service, such as an over-the-top service provider.

In accordance with embodiments of the present invention, there is provided a method for collecting charging information associated with a customer for use of a service offered in a communication network, the method comprising: instantiating a monitoring function at a mobility anchor point associated with a UE, to allow monitoring of traffic flows associated with the UE in accordance with a location of the UE with respect to a topology of the communications network.

In accordance with embodiments of the present invention, there is provided a method for collecting charging information associated with a customer for use of a service offered in a communication network, the method comprising: instantiating a monitoring function configured to monitor traffic flows and generate charging information associated with the monitored traffic flows, the function instantiated at a location in the communication network, the location selected to allow monitoring or tracking of traffic flows terminating within the communication network; and providing charging information to an OSS/BSS entity in the communications network or in a customer network.

In accordance with embodiments of the present invention, there is provided a method for providing a service to a customer via a communication network, comprising: providing information indicative of the service to the customer; receiving a service request from the customer; verifying capacity of the communication network to provide the service; providing the service according to a negotiated agreement; monitoring usage of the service; and charging the customer or another party based on the monitored usage of the service. In some embodiments, the method further comprises modifying the service request according to one or both of: current network conditions; and customer preferences.

In accordance with embodiments of the present invention, there is provided an apparatus comprising one or more computing devices in a network and configured to: instantiate a monitoring function at a location in the communication network, the location selected to allow monitoring or tracking of traffic flows associated with a UE and terminating within the communications network, the monitoring function configured to monitor said traffic flows and to provide indications of the traffic flows; and provide charging information for use in billing the customer based on the indications of the traffic flows. The apparatus may further be configured to provide a session of the service to one or more direct end devices associated with the customer, the session provided in response to an indicated demand.

In accordance with embodiments of the present invention, there is provided an electronic device in a network, the electronic device comprising a processor, a network interface and a memory. The electronic device is configured to instantiate a monitoring function at a location in a communication network, the location selected to allow monitoring of traffic flows associated with usage, by a UE, of a network slice instantiated in the network. The monitoring function is configured to monitor the traffic flows, wherein the UE uses the network slice for accessing an on-demand service; generate network slice usage information based on the traffic flows; and charge a designated payment entity for usage of the on-demand service by the UE, based on the network slice usage information. The electronic device may direct instantiation of the monitoring function in a separate device, or the electronic device may perform the operations of the monitoring function.

In accordance with embodiments of the present invention, there is provided an apparatus for collecting charging information associated with a customer for use of a service offered in a communication network, the apparatus comprising one or more computing devices in a network and configured to instantiate a monitoring function at a mobility anchor point associated with a UE, to allow monitoring of traffic flows associated with the UE in accordance with a location of the UE with respect to a topology of the communications network.

In accordance with embodiments of the present invention, there is provided an apparatus comprising one or more computing devices in a network and configured to: provide information indicative of the service to the customer; receive a service request from the customer; verify capacity of the communication network to provide the service; provide the service according to a negotiated agreement; monitor usage of the service; and charge the customer or another party based on the monitored usage of the service.

BRIEF DESCRIPTION OF THE FIGURES

Further features and advantages of the present invention will become apparent from the following detailed description, taken in combination with the appended drawings, in which:

FIG. 2A schematically illustrates interacting entities according to embodiments of the charging and monitoring method and apparatus of the present invention.

FIG. 2B schematically illustrates further interactions associated with FIG. 2A.

FIG. 6A is a block diagram illustrating an embodiment of a system for VN customer charging.

FIG. 6B is a block diagram illustrating an embodiment of a reverse charging system for on-demand session charging.

FIG. 6C is a block diagram illustrating an embodiment of an on-demand session charging system that includes $3^{rd}$ party payment authorization.

FIG. 6D is a block diagram illustrating an embodiment of an on-demand session charging system that charging to an end user.

It will be noted that throughout the appended drawings, like features are identified by like reference numerals.

DETAILED DESCRIPTION

Figure 1:
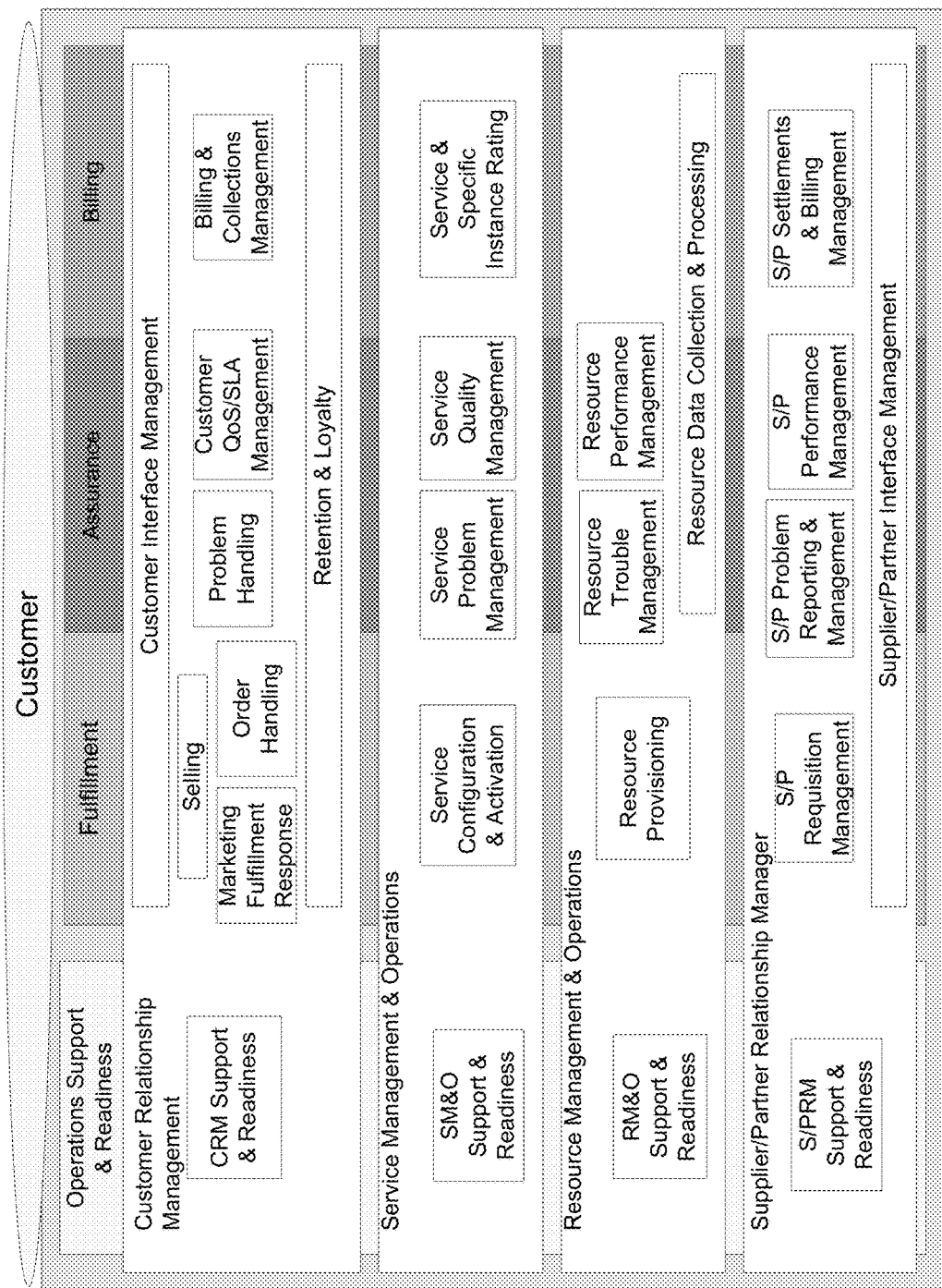
FIG. 1 illustrates a process model based on the Enhanced Telecom Operations Map®, according to the prior art.

As used herein, the terms Electronic Device (ED), "User Equipment" (UE) and "mobile device" are used to refer to one of a variety of devices, such as a consumer or machine-type device, which communicates with an access node via wireless communication. One skilled in the art will appreciate that a mobile device is a device designed to connect to a mobile network. This connection typically makes use of a wireless connection to an access node. An access node may be a base station, Wi-Fi™ access point, NodeB, evolved NodeB, gNodeB, or other device which provides a point of access to a backhaul network. Although the mobile network is designed to support mobility, it is not necessary that the mobile device itself be mobile. Some mobile devices, such as metering devices (e.g., smart meters) may not be capable of mobility, but still make use of the mobile network.

As used herein, a "network" or "communication network" or "mobile network" may provide communication services to various devices including but not necessarily limited to mobile devices. A mobile device can communicate with radio nodes using a protocol and have its data routed to a designated destination. Such a network may include a radio access portion and backhaul portion. The network may further comprise various virtualized components as will become readily apparent herein.

As used herein, Operations Support Systems (OSS) refer to software (and sometimes hardware) systems that support back-office activities for operation of a network and provision of customer services.

As used herein, Business Support Systems (BSS) refer to software applications that support customer-facing activities associated with a network, such as, but not limited to billing, order management, customer relationship management, and call centre automation.

Where 3G/4G networks relied upon network operators that owned the infrastructure that they relied upon, and typically provided service directly to subscribers associated with the UEs that connect to the infrastructure, next generation networks may have an architecture that permits the decoupling of roles in the network. A network operator (NO), or service provider (SP), not to be confused with a MVNO, may not directly own the entirety of the infrastructure that forms part of its network. Some the network resources, including access network resources, may be owned by an infrastructure provider or infrastructure owner. Access to these resources may not be exclusive, for example, more than one network operator may be provided access to the physical infrastructure of a set of so-called small cells within a building or set of buildings. In the context of billing, the infrastructure provider will need to be able to provide billing data to the NO in an agreed upon format, and on agreed upon terms (e.g. based on UE identifiers on a daily basis, or based on a categorization of type of UE on a weekly basis, etc. Each of these could be based on total amount of data consumed (or total uplink, or total downlink), or based on the number of transactions etc.) The NO may be providing access services for a Virtual Network Operation (VNO) that has the relationship with the subscriber. The NO may provide a network slice to the VNO containing the resources required to provide services to the subscribers. The NO can provide a VNO with a network slice within which the resources needed by the VNO can be instantiated The NO may also tailor the properties and attributes of the slice to the requirements of the VNO. The NO may also use slices to segregate traffic associated with different services. This can allow the NO to create network slices that satisfy the needs of each of the specific services. In one such example a slice can be created to serve the needs of a Machine Type Communication service which can support a large number of devices, each of which generates small messages at fixed intervals. Latency and reliability of the transport layer of this slice is likely less important than it would be in a slice that supports Ultra-Reliable Low Latency Communications (URLLC), although the URLLC slice would typically needs to support fewer devices.

VNs are operated by VN operators (VNOs), such as mobile VNOs (MVNOs). A VN is typically created on top of the resources of a NO (and in some examples may rely upon the resources of more than one NO). Reference to a customer should be understood to refer to the relationship between a VNO and the NO from which is receives a resource allocation.

Where conventional 3G/4G networks have addressed the collection of charging information by tracking data traffic associated with a UE at the Packet Gateway (PGW) and Serving Gateway (SGW). The placement of traffic monitoring functions at the gateways allows an NO or MVNO to determine, on a per UE basis, how much data traffic crossed the Radio Access Network (RAN) and Core Network. It should be understood that although the following discussion makes use of terms such as "charging" it could also be properly described as the collection of usage data. By focussing on the amount of data transmitted through gateway functions in a 3G/4G network, the ability of a NO to have a flexible charging system is greatly limited. Charging data is collected on a per-UE basis, and there is little incentive for an NO to implement mechanisms that effectively reduce the traffic generated by as UE. For example, in a scenario in which a plurality of devices are sending messages to the same server, a NO has little incentive to provide an aggregation function that could reduce the amount of traffic leaving its network. Embodiments of the present invention address the mechanism that can be used to collect charging data in mobile networks. Many of the discussions presented below will provide mechanisms for an NO to collect data. The collected data can be aggregated in different ways and either used by an accounting function in the OSS/BSS of the NO, or it can be provided to an MVNO.

To supplement the conventional charging data collection, embodiments of the present invention allow for the placement of monitoring functions at different locations of the network. The charging data collected by the monitoring functions can vary, so that one instance of a monitoring function can track the number of transactions, while another can track the volume of data. A single data flow associated with a UE may be monitored by more than one function. Services may be charged on a per-use basis (e.g. a per-transaction basis), based on traffic (e.g. a per-bit basis), etc. The collected charging data may also include information not used in 3G/4G networks. In addition to a time of day charging structure that is applied across a network, next generation networks may employ geographically differentiated charging. This may allow a network to charge more for data in a geographic region of the network that is particularly congested. To do this, the location of the UE, either in absolute terms, or in relation to the topology of the network would need to be included in the collected data. Furthermore, the time and traffic loads may need to be available to correlate to this charging record if not recorded in the charging data. If the UE location is based on a UE reported location, the placement of the monitoring function can be varied. If the location data is not based on, for example, a GPS location reported by the UE, then the placement of the charging function either at a base station/access node or at an anchor point serving a plurality of base stations can be used to collect this information. To facilitate charging customization, a charging data collection function (or a monitoring function) can be instantiated at a selected location in the core network in order to extract network activity information. This collected information can be provided to the OSS/BSS or to a customer for use in a given billing scenario. Charging can vary for example based on a geographic location of the network usage, traffic or congestion considerations, or time of day considerations, for example.

Embodiments of the present invention provide for a method and apparatus for generating and providing information associated with data usage or transactions associated with either a UE or a specified group of UEs. This collected information can be later used in charging and accounting operations. The charging data collection may enable the implementation of differential charging, for example in which customers are charged at rates that vary with respect to one or a combination of factors, such as geographic location, network traffic or congestion levels, and time (e.g., time of day).

The methods and apparatus may use a network interface designed for this purpose. The methods and apparatus may involve one or more of monitoring, accounting and charging functions which can be instantiated in the network and used to monitor usage of such services. For example, the functions can be instantiated at a base station, anchor point, or core network node or function, or a combination thereof. Data may also be contributed by a mobile device, in which case the mobile device may also include a charging data monitoring and generation function. The methods and apparatus can be used for collecting data associated with charging associated with access to services which can also be instantiated in a core network and monitored to collect data from different points in the data path. Aggregation functions can be used to reconcile and synchronize charging records from a plurality of independent monitoring functions.

According to an embodiment of the present invention, there is provided a method for charging a customer for use of a service offered inside the RAN and the core networks. The method includes instantiating one or more monitoring functions at one or more locations in the communication network associated with the particular service function. The locations can be selected for tracking one or both of: operations of service functions; and traffic flows in the network, corresponding to usage of the service. The monitoring functions can be configured to monitor traffic of transactions associated with these service functions. The monitoring function can be instantiated within the communication network at a location which is selected to allow monitoring or tracking of traffic flows associated with a UE even when the traffic flows terminate within the communication network instead of passing through the core network towards an Internet server. The method further includes collecting charging data based on the indications of the operations, the traffic flows within the network, or both. The monitoring function locations may be proximate to the service functions (e.g. located within the data center within which the service function is instantiated). The method may further include instantiating one or more customer service management functions configured to provide instructions to the monitoring function. This can allow differential types of data to be collected for different traffic flows for different UEs. The method may further include providing and using a database indicative of services being offered by one or more mobile network operators, one or more service providers, or a combination thereof.

In various embodiments, the monitoring function can be instantiated at a mobility anchor point associated with a UE. This can be performed in order to allow monitoring of traffic flows associated with the UE in accordance with a location of the UE, the location being with respect to a topology of the communications network.

According to another embodiment of the present invention, there is provided a method for providing a service to a customer via a communication network. The method includes providing, to the customer, information describing a service being offered. The method further includes receiving a service request from the customer. The method further includes verifying capacity of the communication network to provide the service. The method further includes providing the service according to a negotiated agreement. The method further includes monitoring usage of the service. The method further includes charging the customer or another party based on the monitored usage of the service.

Embodiments of the present invention provide a 5G network which includes monitoring and charging network architecture elements, and which is usable in customer charging operations.

Embodiments of the present invention relate to the impact of 5G network charging operations on a service descriptor, a network slice instance descriptor, and a network slice template.

Embodiments of the present invention relate to the collection of charging data associated with on-demand sessions that may be used in charging operations in mobile communications networks. The charging data collected can be used to accommodate attribution of charging to direct end users who initiate different types of on-demand communication sessions. The charging data collected can be used to accommodate different use case scenarios with different charging options.

According to embodiments of the present invention, there is provided a method for collecting charging information associated with a customer for use of a service offered in a communication network. The method includes providing a session of the service to one or more direct end devices associated with the customer. The session is provided in response to an indicated demand, and may be provided using one or more service functions instantiated in the network. The method further includes instantiating monitoring functions at locations in the communication network. The locations are selected for one or both of: tracking operations of the service functions; and to allow monitoring or tracking of traffic flows associated with a UE (and the service session) and terminating within the communication network. The monitoring functions are configured to monitor the operations of the service functions and to provide indications of the operations or traffic flows, or both the indications of the operations and the traffic flows. The method further includes providing charging information for use in billing the customer based on the indications of the operations or traffic flows, or both the indications of the operations and the traffic flows. In various embodiments, the customer owns and uses at least one of the one or more direct end devices.

The service functions may be instantiated within a network slice, and the network slice can be configured as one of a plurality of specific slice types. Potential slice types include, for example: an enhanced mobile broadband (eMBB) slice used for applications such as user-to-user communication and media consumption; a machine-type communication (MTC) slice used for automated (e.g. non-timing-critical) machine-to-machine communication; an over-the-top (OTT) connection slice used to support OTT services as would be readily understood by a worker skilled in the art; a free access slice used to provide free, potentially limited access to users for various purposes such as provision of public services; and an emergency services slice, used to provide connectivity in emergency situations. In some embodiments, the service functions are instantiated on a machine-type communication (MTC) slice, and the service is charged to a MTC service provider.

In some embodiments, charging data associated with the provided service is attributed to an end user on a pay-per-usage basis, such as a pay-as-you-go basis. A service contract may be used to outline the service and billing parameters, or the service may be pre-paid. In some embodiments, the charging data associated with the service is associated with a service provider instead of an end user. That is, charges for usage of the service can be reversed toward the provider or another sponsoring party.

In some embodiments, a mobile network operator (MNO) operates using the communication network, the service functions and the monitoring functions are provided in a network slice created by the MNO, and the customer is a subscriber to the MNO.

In various embodiments, the session uses a network slice. The network slice may be instantiated using resources of one core network domain and at least one access network domain. In some such embodiments, the method further includes providing, for each of the core network domain and the at least one access network domain, a policy specific to the network slice, the policy indicating how sessions are treated in the respective domain.

Some embodiments of the present invention relate to the satisfaction of monitoring requirements and particular geographic scenarios. Whether the requirements are satisfied may be determined using collected charging data. In some embodiments, the charging operations described herein provide for dynamic load-based charging and user-in-the-loop charging techniques for use in mobile communications networks.

Various charging principles for use in embodiments of the present invention in relation to 5G networks may be defined as follows.

In some embodiments, the entity being charged is a VN customer, an entity using a VN service, or an individual end user. Accordingly, charging data that is collected by a monitoring function can vary based on requirements defined by operational processes and agreements. This data may also be aggregated in different ways based on these requirements.

In some embodiments, penalties may be described in a service level agreement (SLA) and invoked when an operator fails to meet certain key performance indicators (KPIs), such as one or more of network slice-level KPIs, VN service-level KPIs, and individual user KPIs.

In some embodiments, charging data collection/monitoring functions may be provided that are specific to a service, or network slice, or both a service and network slice. Different charging methods may be used for different user groups.

In some embodiments, collection of individual end user charging data may be provided to a VN customer in raw or aggregated fashions. To provide this charging support, the VN customer may be provided with access to a customer-specific charging data collection function which provides data for use by the VN customer in charging its end users. The mobile network operator (MNO) is not necessarily aware of the charging method being used by the VN customer.

In various embodiments, charging data may be collected to contain information associated with one or more of: usage of a bandwidth resource of the communication network; usage of a network-based resource; the number of transactions carried out; and usage of a specific service function provided in the network.

In some implementations, charges levied by a NO on a VNO (or by a VNO on the subscribers) for using an access network may differ from charges levied for using a backhaul network. Accordingly, the manner in which the data is collected, including the location at which the data is monitored for collection, and the information recorded during the collection, may vary. In various embodiments, charges levied for using an access network, or backhaul network, or both an access network and backhaul network may differ based on geographic location at which the usage occurs. This may be the geographic location of the end mobile device receiving data according to the service, for example. For differential geographic access charges, the charging data collection function can be placed at a base station, or at an anchor point associated with a set of base stations. This allows for definitive attribution of traffic in congested areas. In another embodiment, the charging function can be implemented at other locations, and UE specific location information (such as geographic location information provided by a UE-based function) can be recorded.

In various embodiments, particular charges may be levied for providing cached or stored, pre-fetched content. Charges levied for providing cached content may differ from charges levied for providing non-cached content, for example on a cost-per-byte basis. Because requests for data that are served out of a caching function in the network would not register as traffic leaving the core network, requests served out of the caching functions may not be properly attributable in a 3G/4G network. As noted above, by placing charging data collection functions to monitor access to cache data, charging data can be collected and either associated with the UE making the request, or with a content owner depending on the nature of the billing information.

In various embodiments, charges levied may differ based on service type. For example, charges may differ based on characteristics of data provided according to the service, such as QoS, reliability, bit rate delay guarantees, etc.

In various embodiments, charges may be levied for reserving a resource according to the service, whether or not the resource is used.

In various embodiments, the charging policy is negotiable between a customer, such as a VN customer, and network operators. The charging policy may be negotiable for example with respect to bit volume, communication delay parameters, service reliability, or a combination thereof.

In some embodiments, charging rules may vary dynamically over time, and may be updated for example based on network load, network resource availability, or a combination thereof.

In some embodiments, charging rules may vary based on location(s) of end user device(s) User-In-the-Loop (UIL) considerations, or both.

In some embodiments, the collection of charging data is performed so that a service level agreement (SLA) model can be enforced for both parties. In the SLA model, pricing and charging rules are agreed upon. A customer service management (CSM) database can be used to indicate to charging data collection functions which data collection should be performed. A CSM can configure the location of a per-service CSM charging control element based on the manner in which the charging rules are applied.

In some embodiments, collection of charging data follows a per-pay-per-service model. In this model, the service price (charging rate) and charging rule are created based on negotiation between the CSM and a customer. Information indicative of charging rates can be indicated to the designated payment entity or another party.

In various embodiments, charging data collection is included as one of several functionalities of automated customer service management, as provided within a mobile communication core network. The collection of charging data functionality can be integrated with various other functionalities of the CSM. Such other functionalities can include, but are not necessarily limited to collecting of charging data in accordance with: service negotiation and SLA creation; ensuring/validating Quality of Experience (QoE)/Quality of Service (QoS) satisfaction; network functions used for caching and other services; policy control; resource assignment; user context handling; monitoring and feedback mechanisms; and customer billing.

The above functionalities can be provided using functions instantiated in the network, for example using network function virtualization. Such functions can be specific to a network slice. Such functions can alternatively be common functions located in a core network (CN) or a radio access network (RAN), and can service multiple network slices. A slice-specific function can be indicated herein using the prefix "S", e.g. as in S-CSM. A common function (e.g. a function associated with a plurality of different slices, or a function that can be used to serve a plurality of different slices) can be indicated using the prefix "C", e.g. as in C-CSM.

FIG. 2A illustrates interacting entities according to embodiments of the charging and monitoring method and apparatus of the present invention, for example in order to depict an operational model thereof. As illustrated in FIG. 2A, each entity interaction may incorporate an SLA to be followed for charging of the respective entities. For example, as illustrated in FIG. 2A, a VN Customer 1100 (such as a VNO that is a customer of the MNO 1102) can have its VN created using the network resources of an MNO 1102. The MNO 1102 can perform charging data collection so that usage of resources of both the MNO 1102 and the infrastructure provider(s) 1104, can be attributed to the VN Customer 1100. The collection of charging data for will follow the SLA, referred to as SLA-VN1 1110, between MNO 1100 and VN Customer 1102. In addition, the VN Customer 1100 can interact directly with end devices 1106, with charging following another SLA 1108. The data collected by MNO 1102 and provided to VN Customer 1100 should be sufficiently detailed to allow the VN Customer 1100 to be able to satisfy the SLA 1108. The MNO 1102 can also interact with infra-structure and/or subnetwork providers 1104. The charging function between these entity types can be governed by SLA-VN2 1112. The infra-structure and/or subnetwork providers 1104, in turn, can interact directly with the end devices 1106. From the perspective of the end user, there is a relationship with VN Customer 1100 and the interactions with the infrastructure providers and MNO are transparent. Charging between these entities may proceed via a Service Interface 1114 with authentication requirements. The charging rules which have been agreed to will govern where and how charging data is collected, and how it is provided. When one entity provides service to another, the service can be provided according to a temporary or ongoing service level agreement. An entity can use its own resources in providing a service or to acquire and re-sell usage of others' resources, or a combination thereof. It will be understood that reference to buying and selling infrastructure may entail buying or selling access rights to the infrastructure without changing the ownership of the underlying infrastructure.

FIG. 2B illustrates a physical network layout which may be used to support the interaction of FIG. 2A. The layout includes application servers 1122 which are coupled to an operator domain 1126 via a packet data network 1124. The application servers may belong to the VN customer 1100, for example. The operator domain may belong to and be operated by the MNO 1102. One or more sub-domains 1130, 1134 are illustrated. At least one of these sub-domains 1130, 1134 may be operated by the infra-structure and/or subnetwork provider 1104. The sub-domains may be 3GPP domains, for example. The end devices 1106 can communicate with elements of the sub-domains 1130, 1134.

Figure 3:
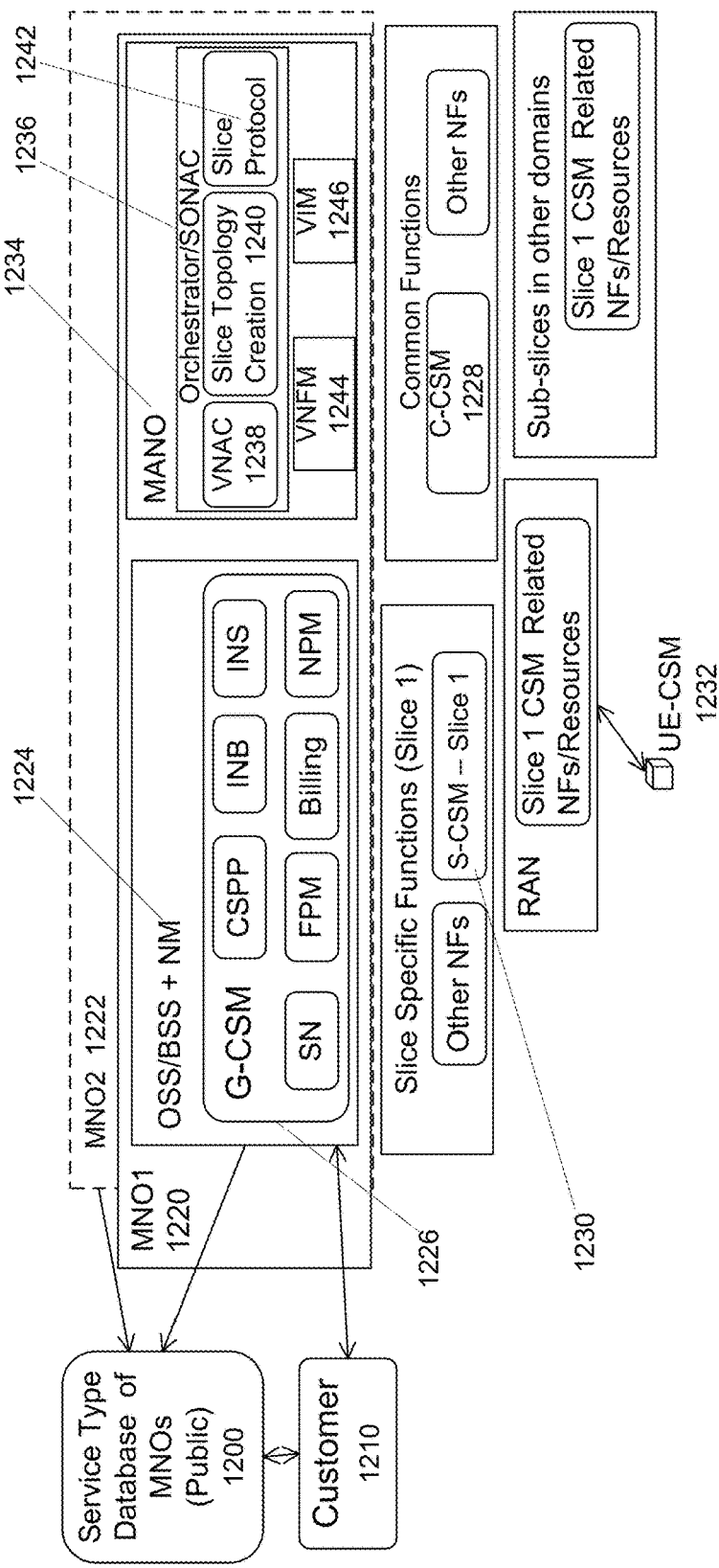
FIG. 3 is a block diagram illustrating components of a charging and monitoring system according to an embodiment of the present invention.

FIG. 3 is a block diagram illustrating a charging and customer service functional architecture according to one embodiment. As illustrated in FIG. 3, according to this embodiment, the system includes a public service provider information database 1200 listing MNOs. The database 1200 communicates with, and stores details relating to, at least one MNO and can be accessed by a customer 1210. In the example depicted in FIG. 3, the database 1200 includes details relating to at least a first MNO (MNO1) 1220 and a second MNO (MNO2) 1222. The database 1200 can include a listing of available services and service types, and associated parameters such as customer charging details, charging capabilities, available customization, etc.

The architecture includes different types of CSM functions. For example, MNO1 1220 includes a Global CSM (G-CSM) 1226, which functions as a component within the OSS/BSS+network management (NM) system 1224, and works on management functions common to all the slices/services of the MNO1 1220. MNO1 1220 further includes Management and Orchestration (MANO) entity 1234, which comprises Orchestrator/SONAC 1236. As used herein, "SONAC" refers to a Service Oriented Network Auto Creation technology, which can be implemented as a set of network control functions or a software controller. In various embodiments, such as illustrated in FIG. 3, SONAC includes enabling technologies, such as Virtual Network Admission Controller (VNAC) 1238, Slice Topology Creation 1240, Slice Protocol function 1242, Virtual Network Function Manager (VNFM) 1244 and Virtual Infra-structure Manager (VIM) 1246. In embodiments where the network makes use of virtualization, such as is depicted in FIG. 3, some of these SONAC functions may reside in an orchestrator. In some embodiments, SONAC may alternatively be described as a Network Function Virtualization Management and Orchestration entity.

The charging and customer service functional architecture may additionally include Common CSM (C-CSM) 1228 functions in the control or user plane, which may be common to all the services/slices. Service/slice specific CSM functions (S-CSM), such as S-CSM-Slice 1 functions 1230 are specific to a single slice. A CSM function operating on the UE, labelled UE-CSM 1232 may be provided, for example in order to allow a UE, or user or owner thereof to interact with other CSM components in the network.

Figure 4:
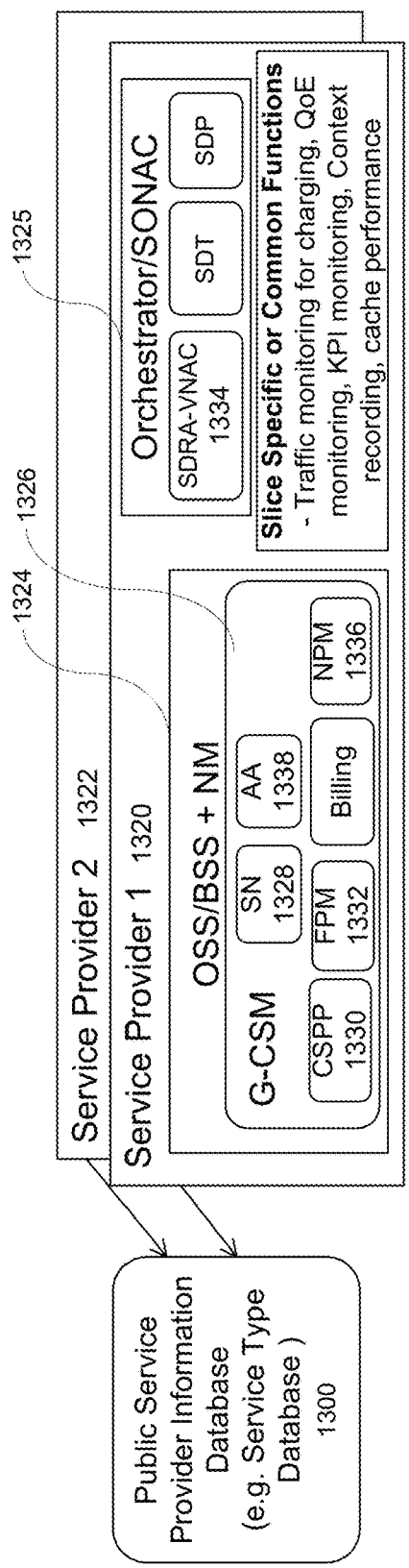
FIG. 4 is a block diagram illustrating components of a charging and monitoring system according to an embodiment of the present invention.

FIG. 4 is a block diagram of components within the architecture illustrated in FIG. 3, illustrating one embodiment of a system for customer charging operations, and the collection of the charging data.

Referring to FIG. 4, the Public Service Provider Information database 1300 maintains a listing of the offered service types of the service providers and associated policies and negotiation steps. The database 1300 further stores details associated with various charging methods. The details may include information about how the charging data is to be collected, and where the monitoring functions are to be instantiated. In the example illustrated in FIG. 4, the database maintains this information for at least Service Provider 1 1320 and Service Provider 2 1322.

Service Provider 1 1320, can include the following functionalities within the OSS/BSS+NM 1324 and the Orchestrator/SONAC 1325:

G-CSM (Global Customer Service Manager) 1326 consists of several CSM functions responsible for all the interactions with the customer during establishment of a new customer service. G-CSM functions may include preparation of the SLA, interaction with the orchestrator to obtain optimum solutions, network monitoring, SLA adjustments, and billing.

SN (Service Negotiator) 1328 is responsible for negotiation with a customer while obtaining capability assessment from VNAC and financial policies from FM.

CSPP (Customer Service Profiles and Policies) 1330 includes the service profiles of different (e.g. all) types offered by the network, and stores the SLA details including policy aspects once a service is admitted.

FPM (Financial Policy Manager) 1332 keeps the financial guidelines for business creation, optimization aspects for profitability and pricing, or both, and may account for market situations and competition.

VNAC (Virtual Network Admission Control) 1334 assesses whether a service request can be accommodated, and assesses the associated resource cost. VNAC also indicates negotiation options (e.g., if extra resources are required).

NPM (Network Performance Monitor) 1336 stores the performance history of the network dynamically updated by the service instance monitoring functions. This is used to calculate the charges including penalties and to re-negotiate SLAs.

AA (Authentication and Authorization) 1338 negotiates the AA methods with the customer and stores customer device and service AA information as appropriate. The AA methods may depend on the charging method.

NM (Network management) configures and manages the network slices and related functions, resources and databases required for the service.

Figure 5:
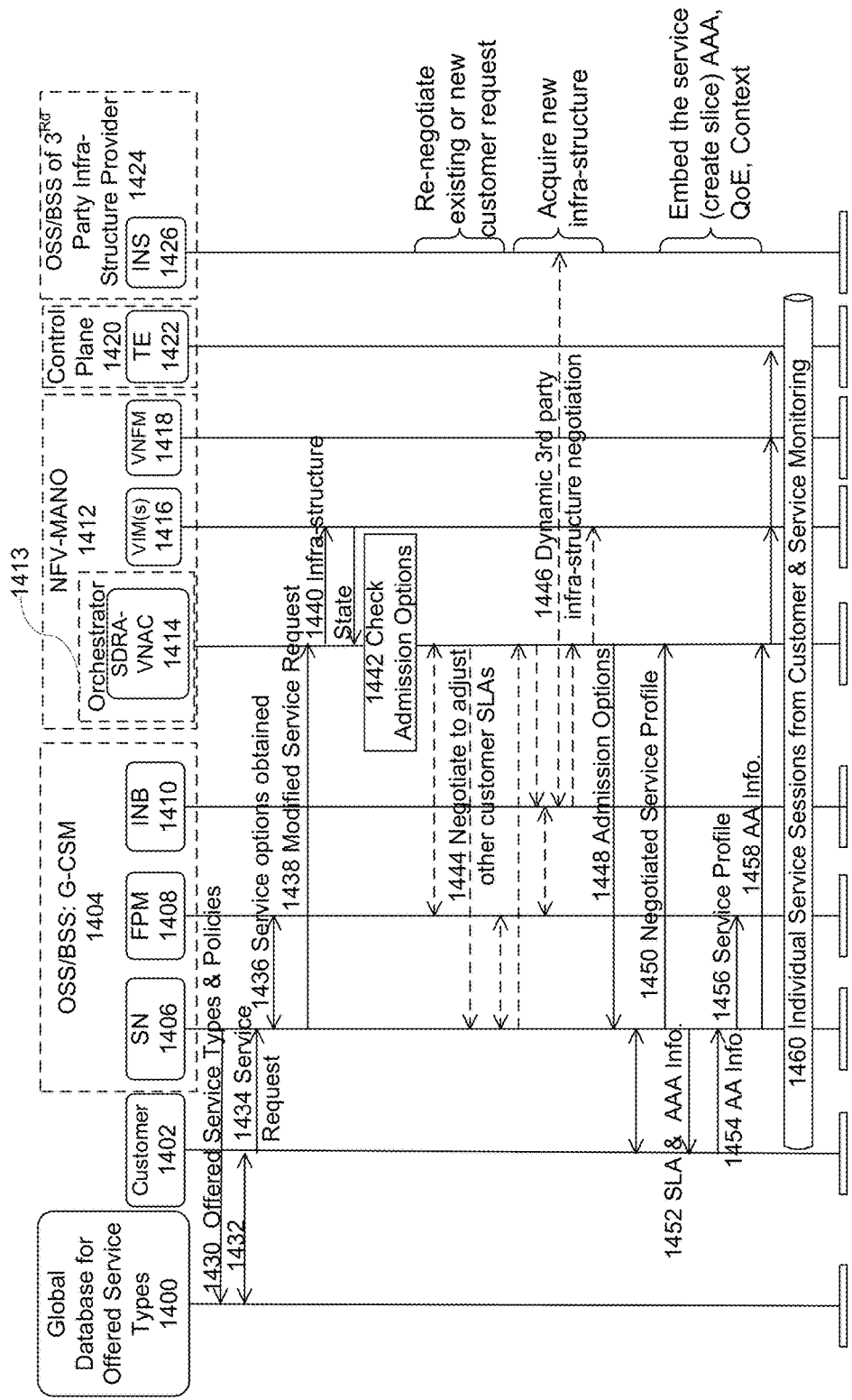
FIG. 5 is a signalling diagram illustrating a charging and monitoring procedure according to an embodiment of the present invention.

FIG. 5 is a signalling diagram illustrating steps of a procedure for 5G VN service provisioning and charging data collection. Operations illustrated in FIG. 5 are described below.

The first illustrated step 1430 is preparation of a public database 1400 for services offered by the network. During this step 1430 the G-CSM 1404 updates all the service types the operator can offer with the policies, coverage areas, traffic input methods, and charging methods, for public view. In one example, the public database 1430 is a database comprising information related to multiple network operators. The information may be made accessible to customers and potential customers.

In step 1432 the customer 1402 (or a representative device such as a UE or computer automatically operating on behalf thereof) makes a service request by reaching the database 1400 and attempting to find a matching service offer(s), following which, at step 1434, the customer (or representative device) makes a service request to interested network operator's Service Negotiator (SN) 1406 in the G-CSM 1404.

In step 1436 the service request is communicated to FPM 1408 and service options are obtained by the SN 1406 from FPM 1408 to generate a modified service request.

In step 1438 the modified service request is communicated to the SDRA-VNAC 1414 of the orchestrator 1413 of NFV-MANO 1412. In the next step 1440 the infra-structure state is communicated between the SDRA-VNAC 1414 and the VIM(s) 1416 within NFV-MANO 1412. SDRA refers to Software Defined Resource Allocation. NFV refers to network function virtualization.

In step 1442 the SDRA-VNAC 1414 checks admission options. During this step a series of communications may be performed to re-negotiate existing SLAs or create new SLAs in response to the customer request. Optionally, in step 1444, SDRA-VNAC 1414 and SN 1406 negotiate to adjust other customer SLAs during step 1442. In optional step 1446 the infrastructure buyer (INB) 1410 of G-CSM 1404 communicates with the infrastructure seller (INS) 1426 of OSS/BSS 1424 of a 3$^{rd}$ Party Infra-structure provider to acquire a new infra-structure.

In step 1448 the SDRA-VNAC 1414 communicates the admission options to the SN 1406, following which, in step 1449 the SN 1406 communicates the options to the customer 1402.

In step 1450 SN 1406 communicates the negotiated service profile to the SDRA-VNAC 1414, and in step 1452, SN 1406 communicates the SLA and AAA (Authentication, Authorization and Accounting) information to the customer. In return, in step 1454, the customer (or representative device) 1402 returns the AA information to the SN 1406. Then the SN 1406, in step 1456, communicates the service profile to the FPM 1408 and, in step 1458, the SN 1406 communicates the AA information to the SDRA-VNAC 1414, which then forwards the information to the VIMs 1416, which forwards the information to the VNFM 1418. The VNFM 1418 then forwards the information to the traffic engineering (TE) entity 1422 in the control plane 1420 of the system. During these steps the service AAA, QoE and context is embedded (e.g., a slice is created).

In step 1460, the individual service sessions from Customer and Service Monitoring proceed. The customer is provided with the service and the service quality and other metrics related to the SLA can be monitored.

Continuing now with a more general description of certain aspects of FIG. 5, in some embodiments, after the service request, the network negotiates the service provision.

The G-CSM compares the service profiles and policies stored in the CSPP and if the G-CSM does not find a match with a service profile or several service profiles, it will either reject the request or re-negotiate a matching profile. If it finds a match, the request will be sent to the VNAC in the network design unit to check the admissibility or to provide options for further negotiation.

In some embodiments, after negotiation of the service provision, the VNAC checks admissibility, designs the best viable network solutions and informs the FPM in the G-CSM. The solutions may include, but are not limited to:
 obtaining additional resources, in which the SN sends a request to the INB for the resources needed and if it can negotiate with an InP with the acceptable (profitable) price accepts the new call; and
 reducing the requirements of existing services or the new request, in which the SN checks the best option out of the VNAC list and renegotiates with an existing customer or the new customer (or representative device thereof).

In some embodiments, the FPM jointly optimizes financial solution(s) with the viable network design options and the SN negotiates with the customer providing different options. If an agreement is reached, the SLA is established (or renegotiated as the case may be). The SLA can include, for example: how to perform AAA with the network operator (SN); required AAA information (e.g., device ID database, keys, capabilities, service types and priorities assigned to different devices.); service policies and KPIs; charging policies with required geographic and time interval definitions, and optionally where and how the charging data is to be collected.

In some embodiments, the MNO subsequently saves the SLA and informs the Network Design unit to create a service instance for this service. The MNO may define the customer service instance descriptor (CSID) and also choose a slice for the service and create or modify the network slice descriptor (NSLD) of the slice.

The CSID and NSLD include indications of methods usable to monitor traffic at different locations and other mechanisms to support above options as appropriate (e.g., traffic filtering methods, session admission control (AC)). The CSID and NSLD may be indicative of operation of functions used for said monitoring usage of the service. The methods may be per-service based, per-user based, or per-session based. Accounting and other policies are maintained in the Global CSM-Charging (G-CSM-Charging) function. The policies may include traffic controlling or policing policies used to handle traffic/resource overload from end users/devices. The G-CSM decides the locations of CSM charging control and monitoring elements (e.g., types of data to log, bits, BW, location, etc.). The network management system (NMS) configures those charging related network functions, data forwarding and access resource assignment for QoS/QoE enforcement to network nodes and elements. The NMS also prepares a feedback mechanism for the QoS violations (e.g., triggering thresholds). The NMS can indicate charging changes in the case of dynamic charging, or provide special charging related messages for service traffic control or for receipt by the customer, or both. The NMS can also provide indications of customer service plan changes and changes to the above-described configurations to the accounting nodes.

Certain customers may have multiple service instances using the same slice instance. In one example, individual service instances are charged separately. In another example, charging is for use of the slice by aggregate services (e.g., prioritization, controlling admission of sessions or controlling generation of certain traffic types). The SLA may be customized to such situations.

In various embodiments, during operation (e.g. from time to time) or after completion of sessions or services, monitored information can be transmitted to the CSM. The CSM can compare actual performance profiles, determined based on the monitored information, with promised performance, which was previously agreed upon during service negotiation or acceptance of a SLA. The comparison can be used to prepare charging data, bills or invoices, or account debiting or crediting information. For example, if delivered performance does not meet promised performance, an agreed-upon discount may be applied.

The method and apparatus as described herein may be used to support different VN service types. In one embodiment, the service type is an on-demand connectivity service provided in response to a direct end user request from an MNO. In this example, charging may be based on on-demand connectivity for a single session (which may include multiple devices) with no SLA. The single session may be provided directly to end users. An example of this type of service is a video conference for a one time session, with on-demand charging, reverse charging (to a third party or over-the-top service provider), or free (no charge) basic service.

In another embodiment, charging is performed for a Virtual Network with end-to-end (e2e) service requirements for a VN customer having its own user/device population. In this case, the SLA may cover traffic demand distributed in different geographical bins/regions and specific times. This may be applicable to a single user with a SLA or VN customer with a SLA (its own service department can be considered as a VN customer). The following are three examples of a VN with e2e service requirements:
 B1 A VN having a single network slice, a single SLA, and providing a single vertical service;
 B2 A VN having a single network slice, and multiple SLAs (e.g. for same application type (alarm services, video delivery services)), and providing one or multiple services;
 B3 A VN having a single network slice, and a single SLA for multiple application types (e.g. having different QoE requirements) as a single aggregated service (e.g., multiple service instances for the virtual network slice with aggregate traffic cap). This may be applicable to an MVNO or a partner service provider.

In another embodiment the VN service is a VN with a specific topology. The VN has specific link/node capabilities (e.g., network, segment/sub-slice) and is provided either: (a) with control; or (b) without control. Such control may refer for example to resource, link, routing or scheduling control, or a combination thereof.

In another embodiment, the VN service belongs to an asset provider having specific resources (e.g., links, nodes, storage) or specific functions (e.g., virtual network function as a service (VNFaaS)). The VN service may be provided either: (a) with full controlling capability; or (b) without full controlling capability.

In another embodiment, the VN service is a special service, such as but not necessarily limited to a caching service, data pre-fetching service, or data analytics as a service (DaaS) service. In this case, related network functions may be instantiated using dedicated slices, or the related network functions may be instantiated in existing slices, with the cooperation of slice owners. For example, for a data analytics VN service, specific user or network information, or data analytics, may be provided to third parties (with consent of the network/end users).

There are at least three different types of customers that can be charged according to various embodiments. As such there are different locations for and types of data collection provided by embodiments of the present system and method. One type of customer is a VN customer. A second type of customer is an end user of an MNO's own VN service. The second type of customer may exist for example in the case that the MNO has its own MTC service or video distribution service which is available to customers thereof. As described in more detail below, the charging methods used for the VN customers is applicable to this case if the MNOs own application/service-providing department is its customer. A third customer type is a customer, such as an individual end user or owner of a single UE, initiating on-demand end user sessions.

FIG. 6A illustrates an embodiment of a system architecture for VN customer charging. As illustrated in FIG. 6A, the VN customer 1500 may be the MNO 1502's own service department, however, this system may also be applicable to the embodiment in which the customer is a VN customer that is separate from the MNO. In the embodiment illustrated in FIG. 6A, end users 1504 and 1506 communicate with the SN 1508 of VN customer 1500 regarding SLA and subscription (including per UE KPIs). The SLA (per VN KPI and per UE KPI) is communicated between VN customer 1500 and MNO 1502. The MNO 1502 provides service delivery to end users 1504 and 1506. Either the billing entity 1510 of MNO 1502 or the billing/collection entity of the VN customer 1500 communicates with the end users 1504 and 1506 regarding billing. Payment is made from the end users 1504 and 1506 to the billing collection entity 1512 of the VN customer 1500.

FIGS. 6B-D illustrates examples of system architecture for on-demand session charging. As illustrated in FIG. 6B, the system architecture can support reverse charging in which an Over-the-top (OTT) entity 1520 delivers a service to an end user 1524 using an MNO 1522. In one embodiment, the service is generated using a function within the MNO. In this example, the MNO 1522 provides billing information to OTT entity 1520, which then provides payment to MNO 1522 for the service delivered to end user 1524.

FIG. 6C illustrates an example of on-demand session charging having $3^{rd}$ party payment authorization. In this example, the $3^{rd}$ party service provider 1530 delivers a service to the end user 1534 using the MNO 1532. Again, in one embodiment, the service is generated using a function within the MNO. Billing information is communicated from the MNO 1532 to the $3^{rd}$ party service provider 1530 and the $3^{rd}$ party service provider 1530 then provides payment to the MNO 1532 for the service delivered to end user 1534. The end user 1534 may provide payment to the service provider 1530.

FIG. 6D illustrates an example of on-demand session charging in which the charging is made directly to the end user 1544 from MNO 1542, which provides both the service delivery and the billing information to end user 1544.

The procedure for collecting charging data may vary based on the VN service provided, as described below.

In one embodiment, charging for the data consumed or for the transactions undertaken is directed to the VN Customer. As such, the data collection requirements can be configured to reflect this. This embodiment may be applicable, for example, for VN customers with specific e2e service requirements, VN customers requiring a specific topology, and for charging VN customers operating as asset providers.

In one example of this embodiment, charging may be based on a contract for a fixed demand. The contract may specify KPIs or may involve capability guarantee-based charging, or both. The contract may include penalties for not meeting performance guarantees and may specify different charging methodologies for different geographical areas and time intervals. The collection of charging data to satisfy these requirements would thus include information representative of the defined KPI requirements. Certain resources may be specified for different charging methodologies. In this example, the SLA may be a long-term SLA but the KPI may be for shorter-term or other-term temporal/geographical windows. For example, the contract may specify a monthly payment agreement for full VN service.

In another example, charging is resource reservation based. This approach may be used for charging for the use of network slices established using hard slicing or for charging based on the amount of resources reserved, or both. Such charging may include penalties for not meeting a promised service requirement. This charging approach may also be applied for providing infra-structure as a service. As a result, the collected charging information might reflect the number of transactions that were satisfied vs. the number of transactions rejected. Alternatively the collected charging data may reflect the volume of data processed in the accepted transactions and the number of rejected transactions.

In another example, charging to a VN customer is usage based charging. For example, a first charge may be levied for access network usage and a second, possibly different charge may be levied for core network usage. Charging may be pay as you go charging, for example. Usage-based charging may be based for example on amount of generated traffic (e.g. number of sessions, bit volume) or based on an amount of resources used for serving the VN customer. The charging data collected would thus be usage based, but it could be reported to the VN customer on a very short reporting cycle so that the VN customer can accurately determine the data usage. The collected data could also reflect the time and location of the data connection along with network usage statistics to enable congestion based billing.

In a further example of charging to a VN customer, a dynamic charging procedure (in which charging rules vary over time, geography, or both) is used. In this example, charging may be based for example on one or more of: network demand, network load, competitive state, bidding for services, location, or UIL.

In another embodiment, charging is made to the end user. This embodiment may be applicable for, for example, on-demand connectivity services, VNs with e2e service requirements, and VNs with a specific topology.

In this embodiment, charging performed may be according to end user service, with billing to the end user directly by MNO and payment obtained from a VN customer. Charging may be performed according to end user service and charged to a VN customer (e.g. in a sub-contract situation). Charging may also be performed by reverse charging the end user (e.g. although charging data is associated with the UE, the charging record is attributed to the content provider instead of the UE).

In one example of charging according to end user service, charging may be for free (to the end user) access to certain servers (e.g., for access to an OTT service provider such as Amazon®). The usage records associated with this usage can be prevented from being attributed to the user. In another example, the charging is performed using a dynamic charging procedure, which may be, for example, demand/load based, competitive state, bidding, location, or UIL based. In such cases the collected data may include load and location information and may optionally include information indicative of user agreement through UIL processes.

In another embodiment, charging is levied for special services (e.g., caching, pre-fetching, DaaS). In this embodiment, charging data may be collected for use of special functions used for the service, for caching or pre-fetching services, or for tracking or providing user context and data analytics.

The charging data collection procedures as described herein may include generic traffic monitoring at different points in the network, along with an aggregation and reconciliation to create a unified traffic monitoring report. The procedures may vary based on, for example, one or more of: what statistics are to be collected, what granularity is required, and the management methods used to guarantee QoS.

Usage/traffic statistics collected may include: bit volume; resource usage; number of sessions; geographical information (such as user location, node location; with, for example, hot spots in network usage, remote areas, and different node types charging differently); and time information. There may be different data collected at different locations in the network, with reconciliation performed by a further aggregation function.

Usage/traffic statistics may be collected with different granularity in different embodiments. In one embodiment, for individual session charging, only bit volume, number of sessions, and geographic information may be used. For other service types, monitoring may be done for the network optimization, admission control, to change demand based charging parameters, etc. Usage/traffic statistics may be, for example one or more of: flow based; session based; UE based (when multiple sessions from same user); service instance based; service type based; slice instance based; slice type based; and aggregated per QoS based.

The method and apparatus for collecting charging data that can be provided for use in customer charging operations as described herein can comprise generic QoE/QoS management methods, monitoring and accounting. The methods may vary depending on SLA parameters.

In one embodiment, the SLA includes a KPI guarantee parameter for a provided e2e VN service/slice. The KPI guarantee may be per geographical bin or/and time or/and user category. The KPI guarantee may indicate, for example one or more of: percent of users in a service outage condition, percent of users in a service satisfaction condition; percent area for a given QoE/outage statistic; percent blocking for a specific demand; and percent dropping for a specific demand. The KPI guarantee may specify minimum performance levels for such parameters. Percent area for a given QoE/outage statistic may refer to the percentage of area, of a total serviced geographic area, that satisfies the given statistic. Percent blocking and dropping may refer to the percentage of service requests blocked and the percentage of packets or service sessions with end users dropped, respectively.

In one example of this embodiment, monitoring data flows and connections to ensure that one or more KPIs for the service can be satisfied may be performed at locations corresponding to different geographical bins, for one or more specific user categories, etc. The collected data can be used by both charging processes, and by slice operations managers (SOM) which may be responsible for adjusting resource allocation to satisfy the KPIs. Charging processes may relate to both the MNO charging the VNO and the VNO charging the end users. According to a predetermined policy, a SOM may take an action, such as policing traffic or blocking further sessions from using the same VN or associated network slice. The action may be based on one or more of: geographic, time, and priority criteria. The action may involve contacting the VN customer for instructions.

In various embodiments, if penalties are specified in the SLA to address variability, then when KPIs are close to violation levels, the MNO may examine the available resources to determine if resource allocations should be modified. As part of an optimization process, it may be decided that resources will not be re-allocated, because the cost of reallocation exceeds any penalties. Monitoring, policing, blocking, etc. points may be determined for different measurements, to reflect the geographical areas and different networks/subnetworks. Such details may be determined by the SOM during creation. If multiple services are served by a single slice, service-specific data collection, policing and session blocking may be performed by identifying service traffic.

In another embodiment, the SLA includes end-to-end per-UE KPI parameters (e.g., aggregated data rate statistics for a UE for a given time interval, per geographic bin (Gbin) or other defined geographic area, peak rate, latency, mobility dependent KPIs). If a per user KPI drops, the SOM is notified. The SOM may obtain other UE statistics in the same area and attempt to provide priority service to the user (over other users) if possible, and subject to fairness and policing considerations. The SOM may instruct subnetworks and nodes to act according to such attempts. These statistics may be based on the collected charging data.

According to some embodiments, per-UE traffic is identified at selected nodes. Further dynamic priority adjustment can be performed to address fairness as per SLA (e.g. scheduler) and charging and penalty policies. The method and apparatus may have the ability to undergo configuration changes to facilitate the above. The VN customer may be allowed to make a decision. Further, there may be extra charges for closed-loop QoE management services if these are implemented.

In another embodiment, the SLA includes an end-to-end per-session QoE parameter. If a per-session KPI drops, the SOM is notified. SOM obtains other session statistics in the same area and tries to provide priority if possible, and subject to fairness and policing considerations. SOM may instruct subnetworks and nodes accordingly.

The method and apparatus according to this embodiment may utilize per-session based identification and fairness across sessions for each subnetwork. As in the previous embodiments, the VN customer may be allowed to make a decision.

In another embodiment, the SLA includes an end-to-end per-flow QoS parameter. If a per-flow KPI drops, the SOM is notified. The SOM obtains other flow statistics in the same area and attempts to provide prioritization if possible, and subject to fairness and policing considerations. The SOM may instruct subnetworks and nodes accordingly. In this case, impacts to session and per-UE traffic may be assessed.

The method and apparatus according to this embodiment may use per-flow based identification for a given session. Applications, customers, or both, may also be consulted or allowed to control traffic. Customers may request additional resources or higher KPIs with higher charging, to address overloading.

Embodiments of the present invention provide for a method and system for collecting on-demand single session 5G network charging data that can be used in operations in which an MNO is serves its own subscribers or mobile devices thereof. The MNO may pre-create several slices (e.g., eMBB, MTC, OTT access, free access or emergency service slices). The MNO collects charging data that can be attributed to end users or device users. In this scenario, some or all of the following may be established: a charging and QoE policy, a policy enforcement function, and a traffic monitoring function for collecting and using charging data associated with an MNO's own subscribers in a given slice.

Further embodiments of the present invention provide for a method and system for supporting on-demand, single session, 5G network charging operations in which an MNO provides a virtual network which satisfies a set of e2e service requirements. The virtual network can be operated by a virtual network operator (VNO) which may be a distinct entity from the MNO. The VNO charges its end users, device owners, or both, using the data provided by the MNO. The MNO may use a Network Slice Instance (NSI) exclusively for this service.

In support of the above-described case, the following may be established: a charging and end user session QoE policy; a VN service KPI policy; and policy enforcement functions at different geographical regions, along with monitoring functions that can collect data used to ensure policy compliance that may also be used in charging. Aggregate traffic and KPIs may be monitored and penalties may be included for not meeting service KPIs. Further, the MNO may also provide operational support to the VNO in the form of assistance in collecting charging data associated the VNO's subscribers (which in some embodiments may be on a per UE basis, on a per UE-class basis, or on the overall VNO subscriber pool). The assistance may include one or more of: the provision of traffic monitoring, executing required charging data collection functions on a per-user basis, and monitoring traffic violations. Aggregate traffic-based charging may be performed if usage based charging is described in the relevant SLA.

Figure 7A:
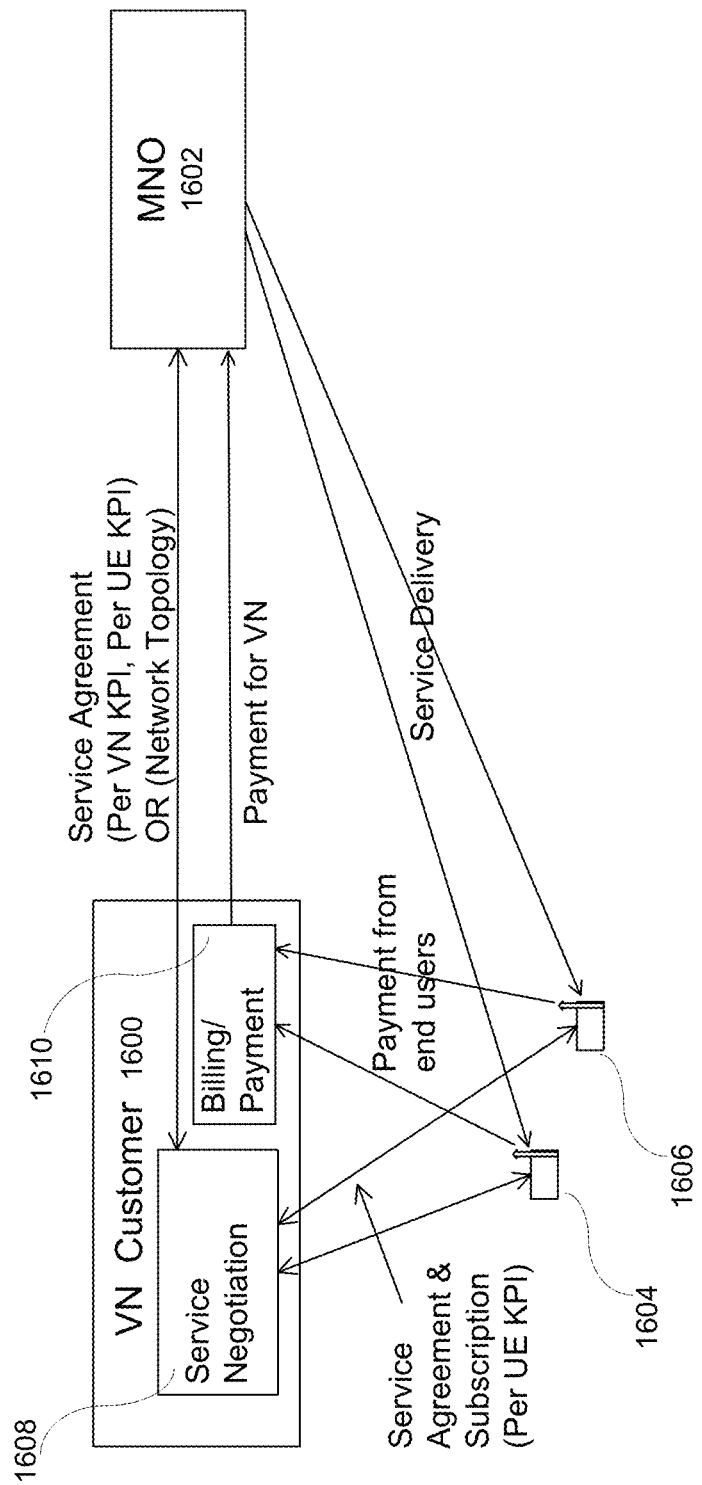
FIG. 7A is a block diagram illustrating an embodiment of a system for an on-demand session charging system employing virtual network customer charging.

FIG. 7A depicts an embodiment of a system for collection of on-demand single session charging data. This collection of charging data supports a scenario in which an MNO provides a Virtual Network with e2e service requirements. As illustrated in FIG. 7A, end users 1604 and 1606 communicate with the SN 1608 of VN customer 1600 regarding SLA and subscription information (e.g. including per UE KPIs). An SLA, including both per-VN KPIs and per-UE KPIs, is established between VN customer 1600 and MNO 1602. The MNO 1602 provides service delivery to end users 1604 and 1606 and the requisite charging data is accumulated and provided to the billing/payment entity 1610 of the VN customer 1600 which can communicate with the end users 1604 and 1606 regarding billing. Payment is made from the end users 1604 and 1606 to the billing collection entity 1610 of the VN customer 1600. The VN customer 1600 provides payment for the VN to the MNO 1602.

In a similar embodiment, the MNO provides a VN with e2e service requirements, but there is no need for the VNO to charge its end users individually. This embodiment may be used for example when the service provider (SP) is a MTC operator with its own devices. As in the previous embodiment, in this case some or all of the following may be established: a charging and end user session QoE policy, VN service KPI policy, and policy enforcement functions at different geographical regions. Aggregate traffic and KPIs may be monitored and charging data can be collected. Penalties may be included in an aggregated charging data report for not meeting service KPIs. In this case, however, evaluating charges for individual end users/devices can be omitted. Nonetheless, individual user QoE may be monitored and used for monitoring VN service KPI. MNO charging may be based on number of end devices, service types or based on usage. For example, charging may be according to a pay-as-you-go model with an initial charge levied for setting up the network.

Further embodiments of the present invention provide for a method and system for providing an on-demand single session network charging operations based on collected charging data in which an MNO provides a VN service to a service provider (SP) having its own subscriber base from whom the service provider obtains payments. The SP may change its charging policy to its subscribers dynamically based on demand or on the competitive environment. This may involve providing a customer-controlled function in the network that receives individual subscriber charging data associated traffic information and informs the user or representative device thereof of the current charging profile.

In this embodiment, the MNO may perform the following: (i) establish a charging and end user session QoE policy, VN service KPI policy and policy enforcement functions at different geographical regions; (ii) monitor aggregate traffic and KPIs in the collected charging data, and include penalties for not meeting service KPIs (as appropriate); and (iii) instantiate the customer's charging functions at appropriate locations in the network and provide required input and other communicating capabilities to those functions.

Embodiments of the present invention also provide for a method and system, which is similar to the embodiment described above, in which an MNO provides a VN service to the service provider (SP) customer, but further in which the customer requests or requires the reservation of a certain amount of resources for its traffic in addition to maintaining its end user service capabilities. In this case, the MNO may accordingly establish a mechanism or function to observe the resource usage and perform charging based on the observed resource usage. Different charging mechanisms may be used for charging usage of different resource types.

Referring again to FIG. 7A, in this example, end users 1604 and 1606 communicate with the SN 1608 of VN customer 1600 to establish an SLA and subscription (including per UE KPIs). An SLA, including network topology requirements, is established between VN customer 1600 and MNO 1602. The MNO 1602 provides service delivery to end users 1604 and 1606. The billing/payment entity 1610 of the VN customer 1600 communicates with the end users 1604 and 1606 regarding billing. Payment is made from the end users 1604 and 1606 to the billing collection entity 1610 of the VN customer 1600. VN customer 1600 provides payment for the VN to the MNO 1602. While the previous example described with respect to FIG. 7A may use a SLA which is based on per-VN KPIs, per-UE KPIs, or both, in the present example the SLA may be based on the network topology requirements.

Embodiments of the present invention provide for a method which is performed when a first MNO uses another infrastructure domain, such as a radio access network (RAN) owned by a second operator. In this case, a service level agreement (SLA) exists between a network manager (NM) of the first MNO and the domain manger (DM) of the second operator. The method may be understood in view of interfaces '2' and '5' shown in FIG. 1 of "3GPP TS 32.101; Technical Specification; 3rd Generation Partnership Project; Technical Specification Group Services and System Aspects; Telecommunication management; Principles and high level requirements," Release 13, V13.0.0, January 2016.

In such embodiments, the charging methods may be similar to the charging methods between VN customers and MNO, with some notable differences that would be reflected in how the charging data is collected and used. In particular, a first service level agreement may use one method and a second service level agreement may use another method, depending on a given VN customer's requirement. Furthermore, if a per-user, per-session or per-service monitoring operation is to be performed by functions instantiated in the RAN, output of these monitoring operations may be transmitted back to the NM of the first MNO. Penalties incurred based on monitored operations may be evaluated based on a QoE compromise that was made to the end user services. The penalties can be reflected in the collected charging data so that there is transparency. Monitoring at or near the radio edge of the network, or at a location within a core network, may be performed when traffic does not fully traverse the core network. In some embodiments, monitoring is more detailed than monitoring of aggregate traffic characteristics.

Figure 7B:
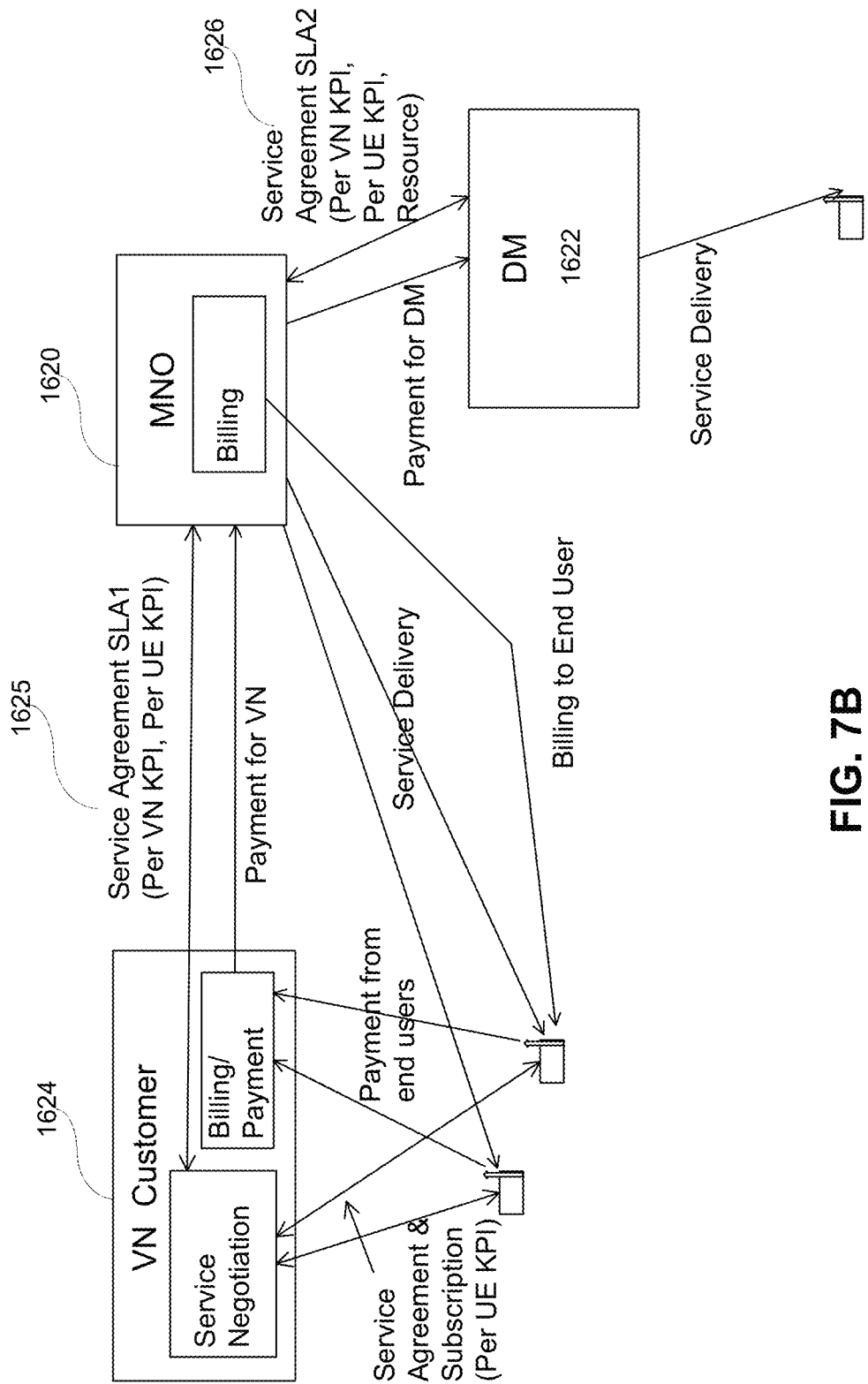
FIG. 7B is a block diagram illustrating another embodiment of a system for an on-demand session charging system employing virtual network customer charging.

FIG. 7B illustrates aspects of an interface between an MNO 1620 and a domain manager (DM) 1622, in association with the above. FIG. 7B relates to an SLA and associated charging between the MNO 1620 and a sub-network which the MNO uses to provide a service. The sub-network may be a RAN part of a network slice which is operated under a different administrator, e.g. the DM 1622. Two SLAs, SLA1 1625 (between the VN customer and the MNO 1620) and SLA2 1626 (between the MNO 1620 and the DM 1622), can use different charging disciplines. For example, SLA1 charging can be based on a number of users with the supported VN customer 1624, while SLA2 charging can be based on the bit volume used to deliver a supported service. The illustrated billing to the end user may be done by the MNO 1620 or VN customer 1624. Another SLA may exist between the VN customer and the end users.

Further embodiments of the present invention provide for a method and system for on-demand single session 5G network charging operations, in which charging data is collected so that the customer can be charged based on the aggregate resource usage of its end users (similar to a pay-as-you-go charging regime). In this case, a mechanism may be provided and configured to observe the resource usage and establish a charging method based on resource usage.

In accordance with some embodiments of the present invention, the system and method for collecting charging/accounting data for on-demand sessions can provide information for use by other entities that may partake or participate in pre-creating slices of different types to provide services. In particular, the MNO may pre-create slices of different types to provide its own services, such as, for example, an eMBB slice, slices for specific service(s) such as one or more of: slices supporting MTC services, OTT access slices (supporting an OTT service), a free access slice providing no-charge network access, and an emergency service slice for use in emergencies. The parameters of these slices may be determined at least partially in accordance with charging data representative of use behaviour in other slices. Furthermore the functions within the slice can be configured so that monitoring/charging data collection functions can be instantiated at different locations in the slice so that the charging model applied to the slice can be supported.

Figure 8:
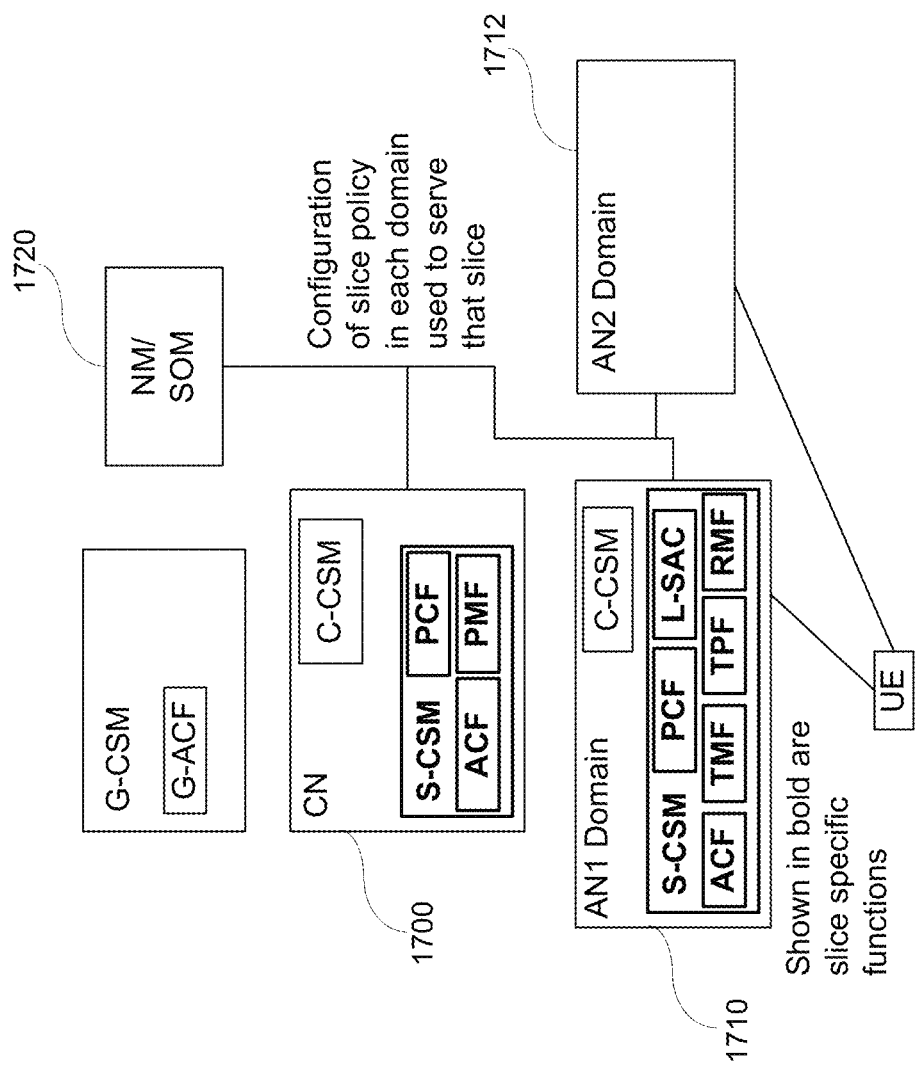
FIG. 8 is a block diagram illustrating aspects of the interaction between domains during a session, according to an embodiment of the present invention.

FIG. 8 is a block diagram illustrating aspects of the interaction between domains during a session and establishment thereof. As illustrated in FIG. 8, traffic associated with a data flow in a session may traverse resources in a plurality of different domains. Collection of charging data may be complicated by such an arrangement. As such, if a second domain is effectively self contained and connected to the first domain at a small number of points, charging data may be collected within the second domain, but if that is not possible, charging data can be collected at the edge between domains, for example at devices that interface directly with both the first and second domains. As will be understood, as illustrated in FIG. 8, the session should use one CN domain and at least one access network (AN) domain. The positioning of charging data collection functions (or other monitoring functions to generate charging data), at the edge of the CN and the AN, allows for collection of aggregate data sent through the particular AN. In the illustrated example, the session uses CN domain 1700, AN1 domain 1710 and AN2 domain 1712. The network management system 1720 of the CN operator may have pre-prepared slices to accommodate the requested service. If not, the session request is rejected. In addition, if the proper authentication is not obtained or payment is not approved (as applicable) or there are insufficient resources, the session can be rejected. Each domain used for a slice is configured with a slice specific policy which includes a description of how to treat the sessions within that domain.

After admission of a session, the behavior of charging data collection functions may be modified to suit the requirements of different accounting systems, QoS/QoE profiles, traffic monitoring functions (TMFs), Traffic policing functions (TPFs), performance monitoring functions (PMFs), and resource usage monitoring functions (RMFs), etc. The charging data collection functions can be notified of the requirements for particular sessions. Each function or node (possibly in each of the domains traversed by this session) can be notified of the type of data to record. This setting of the requirements for data collection can be done according to the policy configuration provided to that domain for this slice.

The placement of these functions may change from service to service, may be different for different geographical zones, and may vary over time.

As described above, in some embodiments, the MNO pre-creates slices of different types for its own services. There are several types of on-demand sessions, which may require pre-creation of different slices.

Table 1 below summarizes steps used in slice pre-creation based on the type of slice.

TABLE 1

| STEPS | eMBB Slice | MTC Slice | OTT Connection Slice | Free Access Slice | Emergency Service Slice |
|---|---|---|---|---|---|
| 1. Check Legitimacy of user and establish payment method | New or may be subscribed for pay-as-go | Devices already identified, payment already | OTT policy provided to CN/RAN. IDs for some users provide | Government or City may pay the | There may be different levels of emergency needs for different |

TABLE 1-continued

| STEPS | eMBB Slice | MTC Slice | OTT Connection Slice | Free Access Slice | Emergency Service Slice |
|---|---|---|---|---|---|
| | | arranged with device owners | beforehand. New users may give access according to OTT policy. Pre-arranged with OTTs to reverse charge - bulk basis for certain load or usage based. OTT forums may pay for their own slice. | costs. | users/devices. Some may be charged, e.g. child protection or police may use different emergency services. |
| 2. Broadcast/unicast service availability by ANs | Yes | Yes | Yes | Yes | Necessary for specific services. |
| 3. Check admissibility | Yes | Yes | Yes | Yes | Necessary for specific services. |
| 4. Service monitoring | Yes | Yes | Yes | Yes | Yes |
| 5. Accounting evaluation | Yes | Yes | Yes (reverse charging) | Yes | Necessary for specific services. |

As shown in Table 1, the legitimacy (e.g. credentials) of a user and payment method can be checked as part of slice pre-creation. For the various slice types listed, this may involve the following:

For an eMBB slice, new user authentication may be performed and an approved payment method may be identified. The payment method may involve a commitment by a 3rd party to cover the payments. A user may have already subscribed as a pay-as-you-go user.

For an MTC slice, devices may already have been identified, and payment may already be pre-arranged with device owners.

For an OTT slice, OTT policy may be provided to the CN/RAN. IDs for some users may be provided beforehand. New users may give access according to OTT policy. A pre-arrangement may be made with OTT service providers to reverse charges. That is, the OTT provider may be charged instead of the end users. The arrangement may be negotiated on a bulk basis for a certain load or usage level. OTT forums may pay for a group of OTTs.

For a free service slice: a government or city may commit to pay the costs for a certain limited level of slice capability.

For an emergency slice, there may be different levels of emergency needs for different users/devices. Some services may be charged, while others may be free or pre-paid. Different emergency authorities, such as child protection services and police, may use different emergency services.

Accordingly, the types of charging data collected, the location at which the data is collected, and the frequency with which the data is reported to other nodes can be adjusted.

Referring to the second step in Table 1, the availability of broadcast/unicast services offered in ANs and associated charges are considered. This may be applicable particularly for multi-service slices such as multicast broadcast multimedia services (MBMS, or eMBMS) provided within an eMBB slice. The availability and charges may vary geographically, over time, or both.

Referring to the third step in Table 1, the MNO checks admissibility of the session during a session admission control (SAC) operation. This step is potentially applicable to all the slice types referenced in Table 1. SAC may be done on a per-slice basis. A slice specific SAC function may be used. The admissibility may be checked with respect to the other network domains, e.g., the RAN. In some embodiments, if dynamic charging or UIL routines are to be used, then the other network components may indicate cost parameters that may change dynamically.

Referring to the fourth step in Table 1, the MNO performs service monitoring for charging and performance. For the provided services, performance, traffic, and resource usage monitoring is established at different physical nodes in the network. Even if charging is not based on the amount of traffic/resources, usage/traffic monitoring, performance monitoring may be done for network operation purposes. For example, performance monitoring, using the collected charging data, may be performed to support penalties, historical data analysis, network optimization, or a combination thereof.

For certain MTC services, aggregation points may be selected for use in monitoring network traffic, network resource usage, or both.

In various embodiments, sub-networks may be instructed to apply slice-level policies to sessions and monitor traffic and report the usage/traffic statistics.

Referring to the fifth step in Table 1, determination of charging and collection is performed. A per-slice charging/accounting evaluation function (ACF) in each domain obtains the traffic monitoring input related to all the sessions using the slice. Evaluation can be performed by the ACF or the information can be sent according to an accepted format. The information may include, for example, one or more of: QoS information, service information, time and geographic based information, performance degradation information, and penalties incurred as per slice policy.

At the termination of a session, each network domain may send the collected network usage, traffic details, performance details, or a combination thereof, to the NM. The G-ACF in the OSS/BSS may then decide the charges to be levied (to entities such as end users, OTT providers, etc.), if applicable. The G-ACF may also determine an amount to be paid for usage of other domains supporting the session, or include those details to the other domain usage statistics for future payment purposes according to SLAs with other domain operators.

Figure 9:
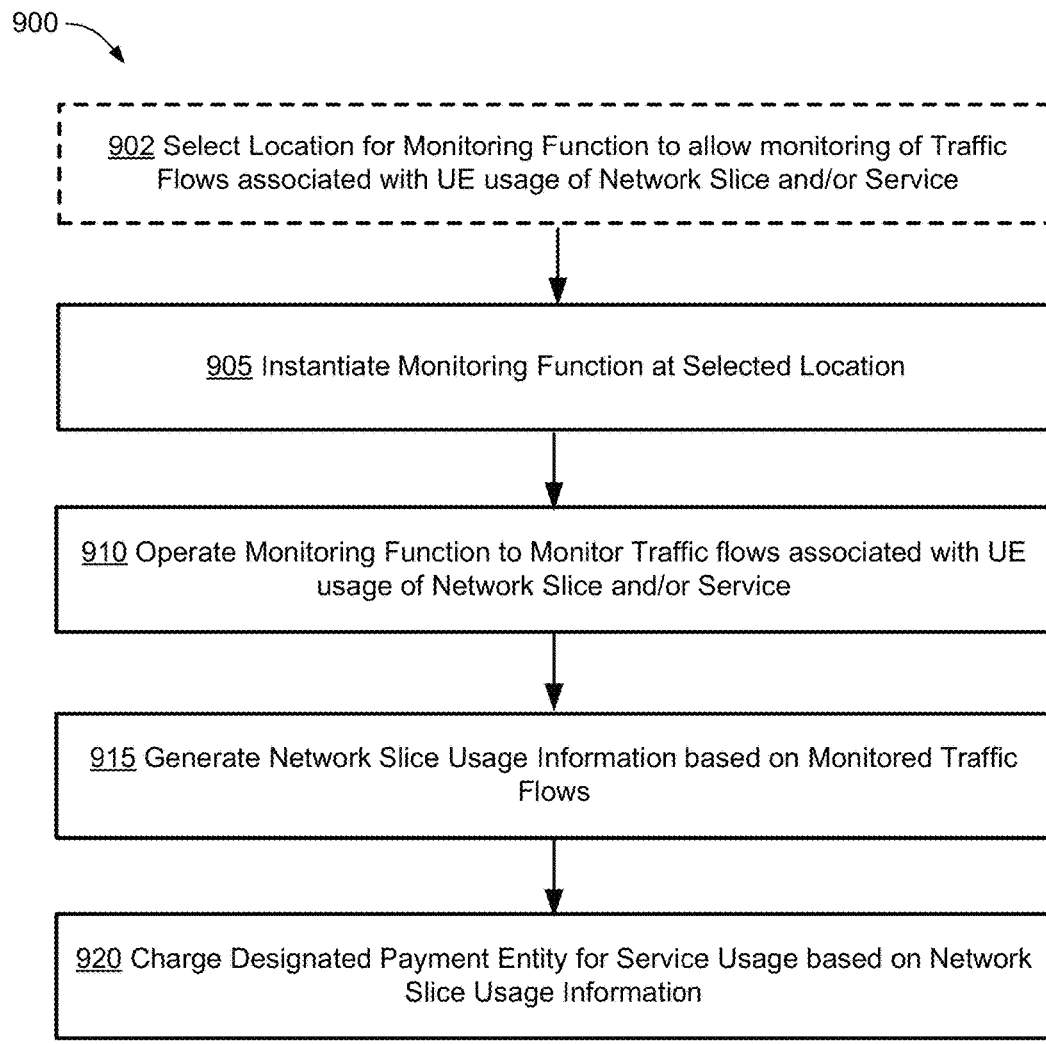
FIG. 9 illustrates a method for collecting network usage information, in accordance with an embodiment of the present invention.

FIG. 9 illustrates a method 900 for collecting network usage information, in accordance with an embodiment of the present invention. The method 900 includes instantiating 905 a monitoring function at a location in a communication network. It will be understood that the instantiation of the monitoring function, or any other such functions, may comprise transmitting an instruction to instantiate the function. The location is selected to allow monitoring of traffic flows associated with usage, by a UE, of a network slice instantiated in the network. The method optionally includes selecting 902 the location. The method includes operating 910 the monitoring function to monitor the traffic flows, wherein the UE uses the network slice for accessing an on-demand service. The method further includes generating 915, by the monitoring function, network slice usage information based on the traffic flows. The method further includes charging 920 a designated payment entity for usage of the on-demand service by the UE, based on the network slice usage information. The designated payment entity can be an over-the-top service provider, for example as in FIG. 6B, a third-party service provider such as a party responsible for payment for use of the service, for example as in FIG. 6C, or an entity responsible for the UE, for example as in FIG. 6D. Because the service is on-demand, the customer entity responsible for the UE does not necessarily have a prior contractual relationship with the service provider.

Figure 10:
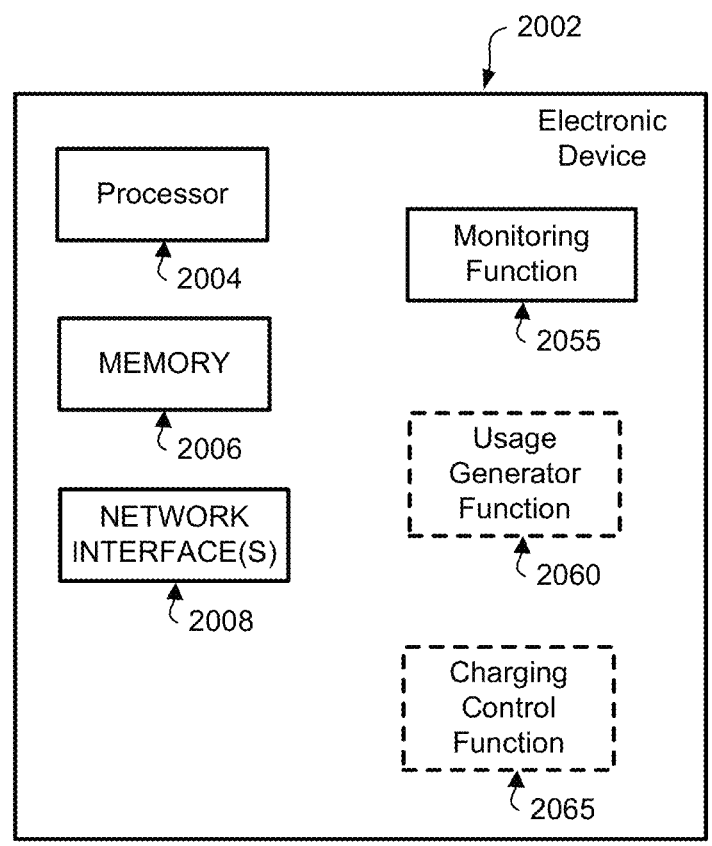
FIG. 10 illustrates an electronic device for collecting network usage information, in accordance with an embodiment of the present invention.
Figure 14:
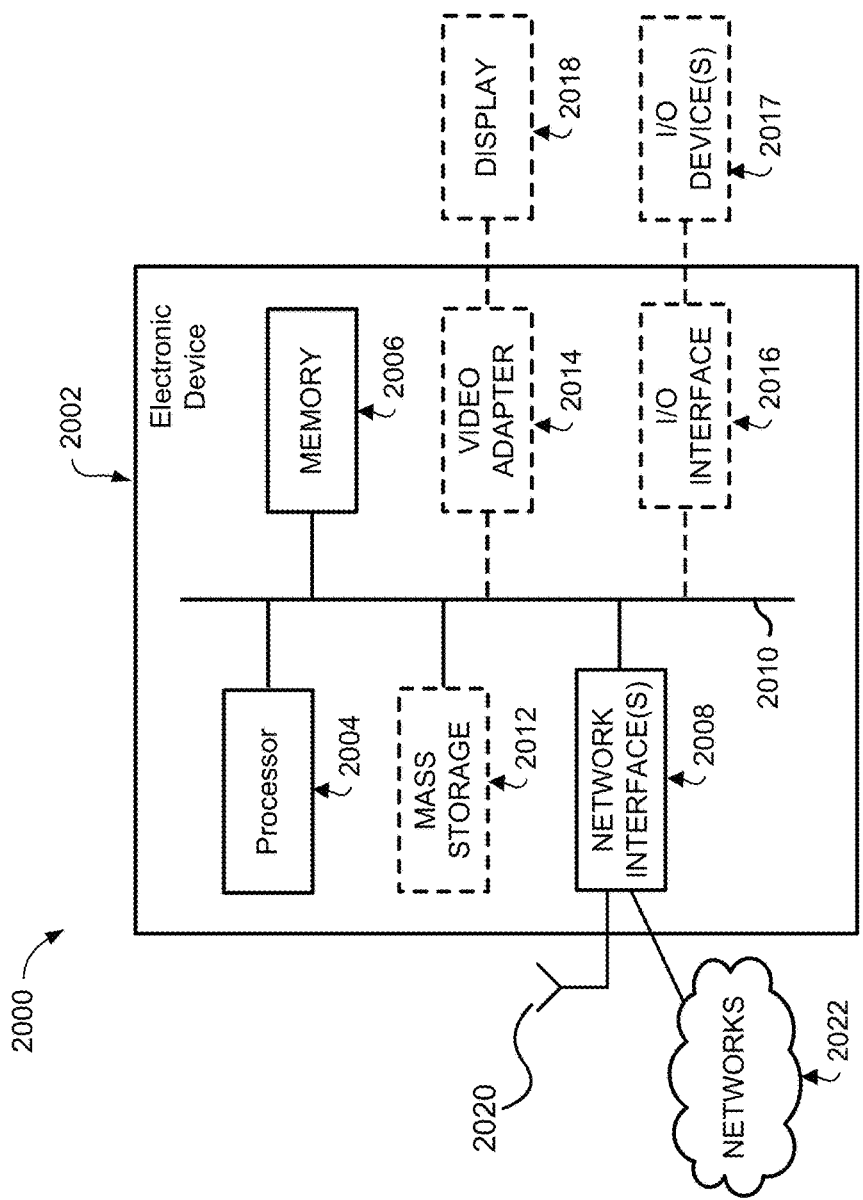
FIG. 14 is a block diagram of an electronic device within a computing and communications environment that may be used for implementing devices and methods in accordance with representative embodiments of the present invention.

FIG. 10 illustrates an electronic device 2002 for collecting network usage information, in accordance with an embodiment of the present invention. The electronic device includes a processor 2004, a memory 2006 and a network interface 2008, as also shown in FIG. 14. The electronic device 2002 includes a monitoring function 2055 at a location in a communication network. The location of the monitoring function and electronic device is selected to allow monitoring of traffic flows associated with usage, by a UE, of a network slice instantiated in the network. The monitoring function is configured to monitor the traffic flows, wherein the UE uses the network slice for accessing an on-demand service. The monitoring function 2055 or an associated usage generator function 2060 of the electronic device 2002 is configured to generate network slice usage information based on the traffic flows. The monitoring function 2055 or an associated charging control function 2065 of the electronic device 2002 is configured to charge a designated payment entity for usage of the on-demand service by the UE, based on the network slice usage information. The charging control function may generate charging information based on the network slice usage information. The charging information is used in the charging of the designated payment entity.

Figure 11A:
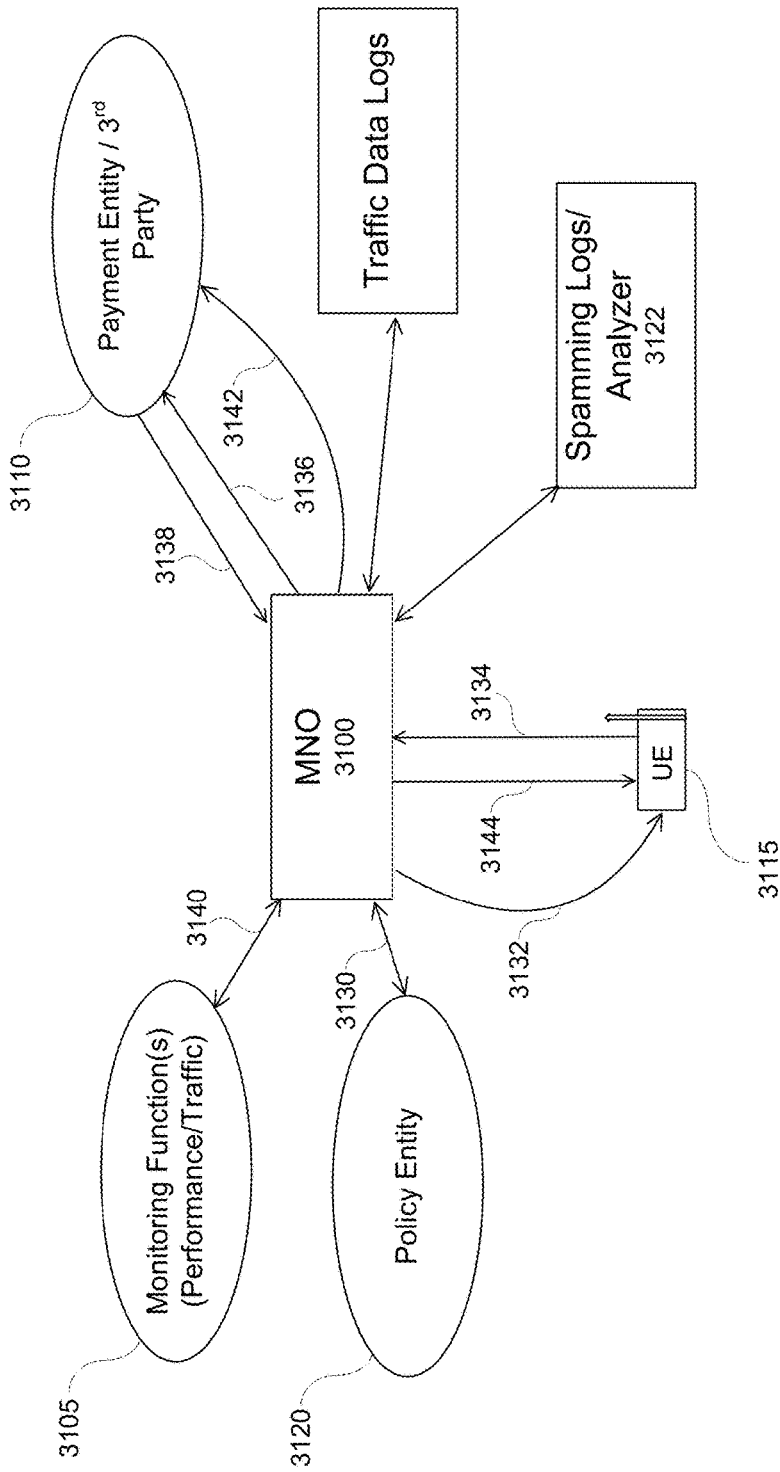
FIG. 11A illustrates interaction between entities including a monitoring function and a designated payment entity, the entity being a third-party responsible for payment, according to an embodiment of the present invention.
Figure 11B:
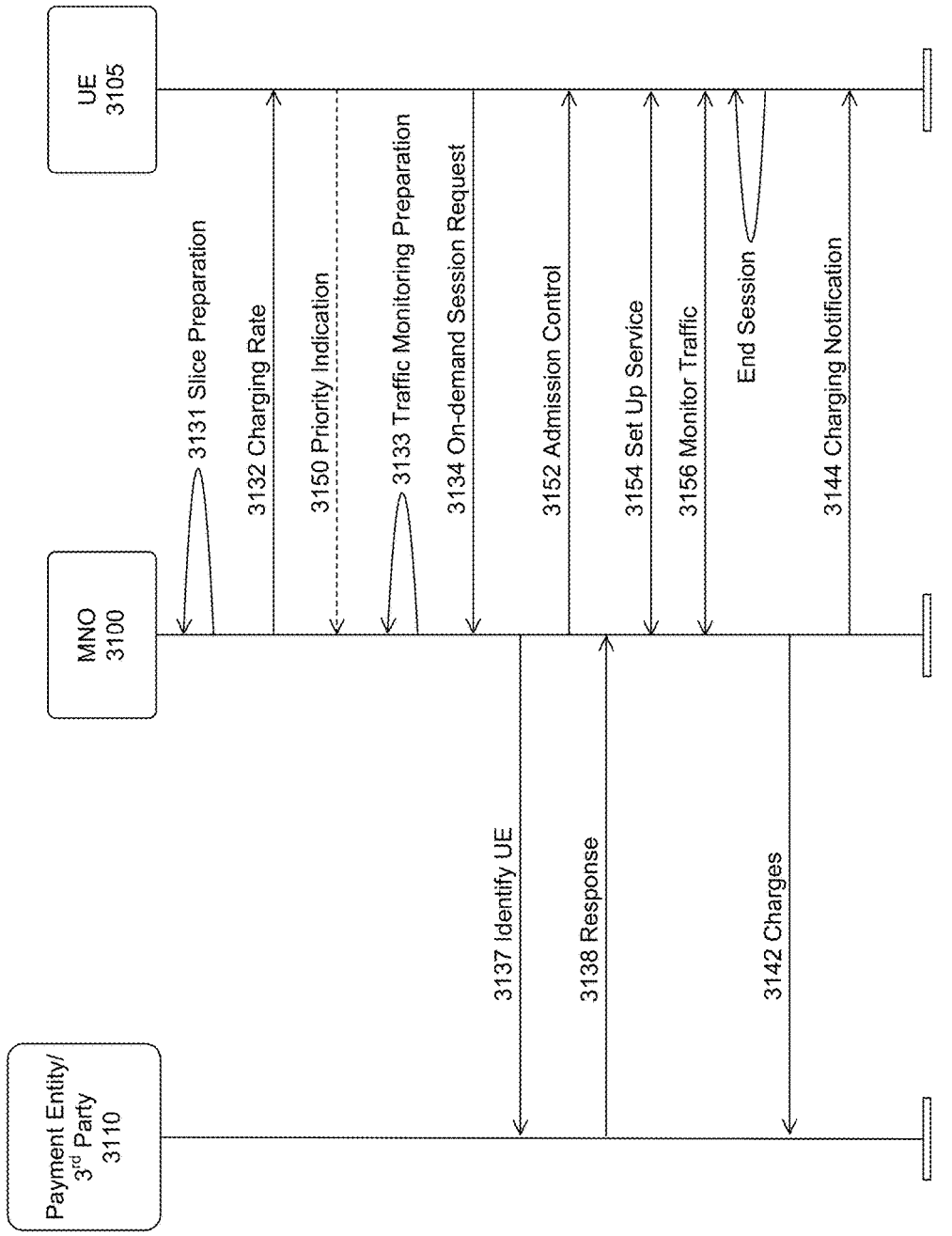
FIG. 11B illustrates a call flow diagram for the interaction of FIG. 11A.

FIGS. 11A and 11B illustrate interaction between entities including an MNO 3100, a monitoring function 3105 and a designated payment entity 3110, according to an embodiment of the present invention. The designated payment entity 3110 in this embodiment is a third party responsible for payment for access to the service by a UE 3115. UEs without a prior subscription initiate an on-demand session and the third party is responsible for payment for same.

Initially, the MNO 3100 makes a policy decision to allow UEs without a subscription to specify a payment method from a credible payment authority, such as a bank or credit card company, and to initiate an on-demand session. The policy establishment operation is shown as an interaction 3130 with an entity such as a policy entity 3120 of the MNO. The payment authority is the designated payment entity 3110. The MNO can use an existing network slice or create a new network slice for supporting such sessions. The MNO therefore prepares the network slice 3131 (See FIG. 11B) to support the sessions. The MNO announces (for example using broadcast channels) charging rates for different types of on-demand sessions for any (non-subscribed) user to access and obtain. The announcement can include a wireless communication 3132 to the UE 3115. Charging may be determined using TMF, PMF, TPF, or a combination thereof. Different charging rates for different traffic prioritization levels can also be specified, and customers can accordingly request a higher prioritization level at the cost of a higher charging rate. A priority indication or request 3150 (See FIG. 11B) can optionally be made by the UE in this regard.

In more detail, a traffic monitoring function (TMF) monitors traffic in different levels of granularity. The TMF may monitor traffic bit volume, service duration, flow type, flow duration, or a combination thereof, for example. Different traffic monitoring functions may be located in different geographic regions.

In more detail, a performance monitoring function (PMF) monitors service performance according to SLA requirements. Performance monitoring may include monitoring one or more of: QoS monitoring, penalty requirements for QoS violations, and QoE measurements. The PMF may monitor performance at one or more different granularities. For example, performance can be monitored on a per-UE basis, a per-flow basis, a per-slice basis, or a per-service basis (e.g. in the case of network KPI monitoring). In some embodiments, performance monitoring can be performed on a QoS basis, for all aggregated traffic corresponding to a service.

In more detail, a traffic policing function (TPF) performs operations such as prioritizing traffic, blocking or marking traffic for discarding, performing admission control for admitting only certain types of traffic, and other policy enforcement operations. The TPF may operate based on the SLA and thereby enforce the SLA.

In more detail, a resource usage monitoring function (RMF) monitors resource usages with one or more specified levels of granularity. As above, granularity levels can include resource usage on a per-UE basis, a per-flow basis, a per-network slice basis, and a per-service basis. In some embodiments, performance monitoring can be performed on a QoS basis, for all aggregated traffic corresponding to a service.

The MNO 3100 also interacts with the monitoring function 3105, and instantiates the monitoring function at an appropriate location if required. The MNO initiates configuration (preparation) 3133 of the monitoring function 3105 to perform traffic monitoring, for example including collecting geographic and time information, and including performance monitoring. Performance monitoring can include monitoring for and reporting events such as service non-availability, service drop-out, service blocking, etc.

The UE 3115 subsequently checks the broadcast channel for on-demand charging information and initiates an on-demand session via a message 3134 to the MNO 3100. The message 3134 may include a UE global ID, charging information, a payment method, and a requested priority. In response, the MNO 3100 interprets the message 3134 as a request for an on-demand session with $3^{rd}$ party authentication. If sufficient network resources are available, the MNO passes the UE payment information to the designated payment entity 3110 in the form of a payment authorization request 3136, which includes an identification 3137 (See FIG. 11B) of the user. If sufficient network resources are not available or if the UE is unauthorized, the request is denied. For example, the MNO 3100 may consult a spamming/log analyzer 3122 to determine if the UE has been black listed previously (e.g. spamming user). More generally, the MNO 3100 performs admission control 3152 (See FIG. 11B) to determine whether to grant the UE on-demand session request.

The designated payment entity 3110 then transmits, to the MNO 3100, a response 3138 to the payment authentication request. If the payment response is negative, the message 3134 is marked for further analysis by the analyzer 3122, to determine possible inclusion in the black list. For example, a high number or high frequency of denied requests may cause the UE's global ID to be added to the black list. Black list entries may be provided to authorities time to time for further action.

If the request is admitted and the payment response 3138 indicates that the designated payment entity is responsible for paying for usage, by the UE 3115, of the on-demand service, then the MNO 3100 sets up 3154 (See FIG. 11B) and provides the service and the monitoring function 3105 monitors 3156 (See FIG. 11B) traffic and resource usage for to the service. The monitoring may be per-UE monitoring, per-service monitoring, per-priority monitoring, or a combination thereof. Monitored information can include some or all of: service/flow type and duration; traffic volume (e.g. Bit volume) per service/flow type; resource usage; and number of flow/sessions/per service.

Information, for example in the form of network slice usage information, or service or network data, as generated by the monitoring function 3105, is provided 3140 to the MNO 3100. The provision may occur upon completion of the on-demand session, for example. The MNO then generates charging information based on the provided information and transmits the charges 3142 to the designated payment entity 3110. The UE may also be informed of the charges via a notification message 3144.

In FIG. 11B, as well as in other call flows and procedures as described herein, two phases of operation are included. First, a preparation phase is performed in which the network slice is prepared (and instantiated if required), an SLA is established, charging methods are established, and monitoring and policing functions are configured (and instantiated if required). Second, an operating phase is performed upon receiving a request from a UE for service. In the operating phase, service provision, monitoring and charging are performed, having been previously configured.

Figure 12:
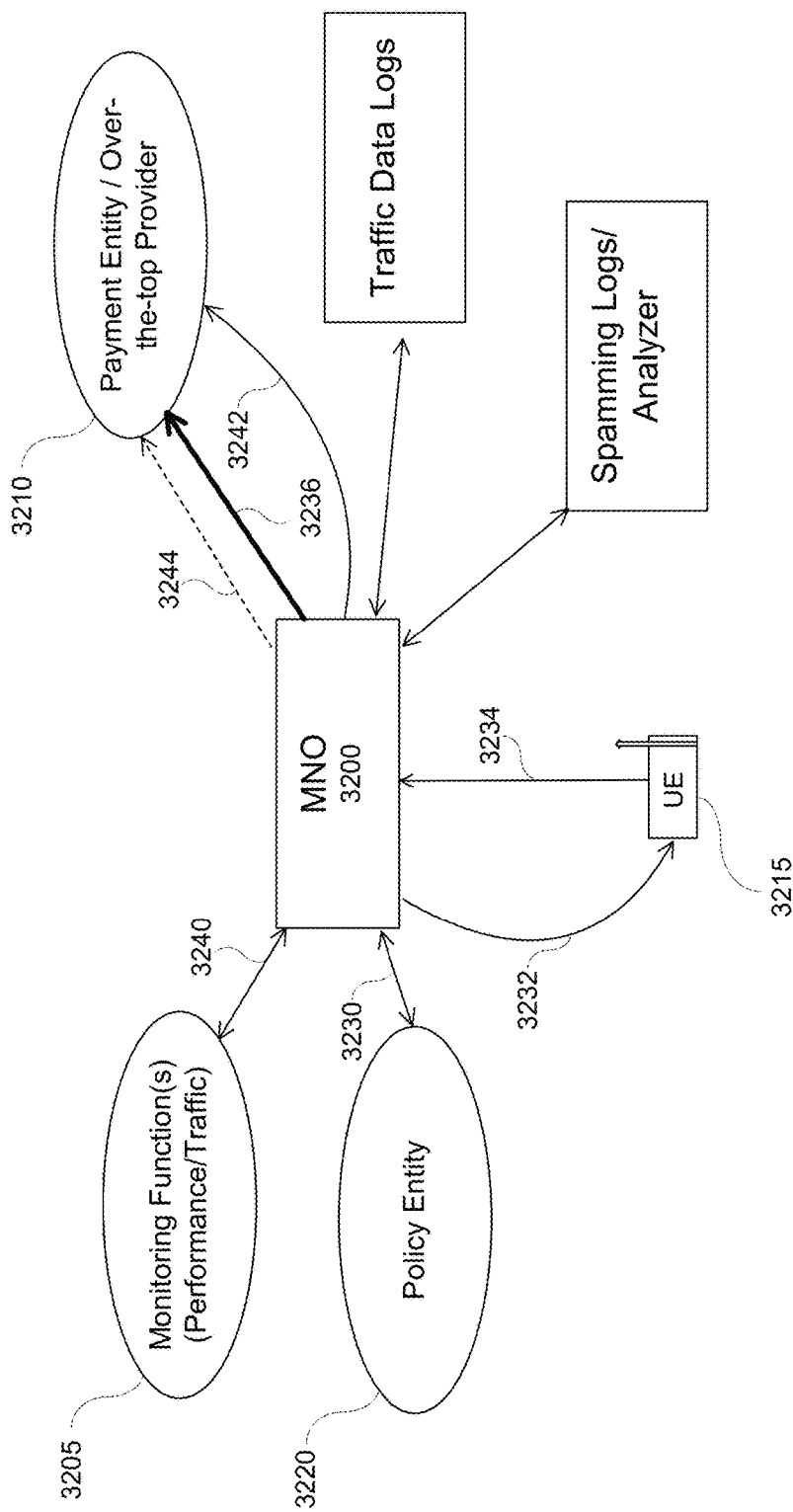
FIG. 12 illustrates interaction between entities including a monitoring function and a designated payment entity, the entity being an over-the-top service provider, according to another embodiment of the present invention.

FIG. 12 illustrates interaction between entities including an MNO 3200, a monitoring function 3205 and a designated payment entity 3210, according to another embodiment of the present invention. The designated payment entity 3210 in this embodiment is an over-the-top service provider. A UE 3215 without a prior subscription obtains limited access to the over-the-top service provider, for example to check the services available or to perform limited transactions such as account administration actions, trial usage, etc.

Initially, the over-the-top service provider 3210 requests that unknown users be given limited access to its services (e.g. servers, website, etc.). The MNO 3200 decides to use an existing slice or create a slice for this purpose. The access limitations are agreed upon by the MNO in association with the over-the-top service provider. Charges for usage of this limited service are evaluated or a pay-as-you-go charging arrangement is determined, by forming an agreement with the over-the-top service provider. For example, the type of access and the allowed capacity can be determined in this manner. Policy establishment 3230, including establishing charging parameters, can accordingly be performed by the MNO 3200 in cooperation with a policy entity 3220.

Next, the MNO broadcasts 3232 the identities of over-the-top service providers that can be accessed free of charge by (e.g. non-subscribed) UEs. This may alternatively be done via unicast messages in response to queries from UEs (e.g. UE 3215). The MNO 3200 also interacts with the monitoring function 3205, and instantiates the monitoring function at an appropriate location if required. The MNO initiates configuration (preparation) of the monitoring function 3105 to perform traffic monitoring, for example including collecting geographic and time information, and including performance monitoring. Performance monitoring can include monitoring for and reporting events such as service non-availability, service drop-out, service blocking, etc. Different charging rates for different traffic prioritization levels can also be specified, and customers can accordingly request a higher prioritization level at the cost of a higher charging rate.

The UE 3215 subsequently checks the broadcast channel (or requests and receives a unicast message) and thereby identifies over-the-top service providers that can be accessed free of charge (i.e. free to the UE). The UE transmits a request 3234 to access a selected over-the-top service provider, which is identified in the request. The request 3234 can include prioritization information. The MNO 3200 checks the identity of the over-the-top service provider in the request 3234 to determine whether it is on the list of service providers that can be accessed free of charge. If so, and if the request can be accommodated without exceeding set limitations for providing access to the service provider, and optionally if the UE 3215 is not on a black list, then the MNO 3200 provides 3236 the limited service and the monitoring function 3205 monitors the traffic flows associated with usage by the UE 3215 of the limited service. The monitoring may be per-UE monitoring, per-service monitoring, per-priority monitoring, or a combination thereof. Monitored information can include some or all of: service/flow type and duration; traffic volume (e.g. Bit volume) per service/flow type; resource usage; and number of flow/sessions/per service.

Information, for example in the form of network slice usage information, or service or network data, as generated by the monitoring function 3205, is provided 3240 to the MNO 3200. The provision may occur upon completion of the on-demand session, for example. The MNO then generates charging information based on the provided information and transmits 3242 the charges to the designated payment entity (over-the-top service provider) 3210. Such transmission of charges may occur for example if a pay-as-you-go service model is being used. Otherwise, the MNO 3200 may transmit 3242 traffic data to the designated payment entity 3210 for analysis thereby. In some embodiments, the MNO 3200 can transmit 3244 bulk charging data to the designated payment entity 3210, for example as agreed in the service level agreement. Bulk charging may be on the basis of one or more of: specified demand per geographical area; specified resource; a pay-as-you-go charging model based on aggregated monitoring parameters; and dynamic charging. The over-the-top service provider may also provide information regarding spamming and black listed UEs.

In various embodiments, as mentioned above, charging can be based on specified demand per geographical area. In some such embodiments, the payment entity initially indicates a demand for each geographical area (and possibly for different time intervals) for a given type of service. Charging is based on the indicated amount of demand rather than the actual amount of traffic, even if actual traffic amounts are lower. If the actual amount of traffic exceeds the specified demand, the MNO may block the excess traffic or charge additional amounts for overage. The specified demand may be expressed as a statistical function. For example, the specified traffic demand may indicate an average demand of 5 Mbps with a peak demand of 8 Mbps, for a given time interval in a given geographical area. As another example, the specified traffic demand can be a truncated Gaussian distribution with a mean of 5 Mbps.

In various embodiments, as mentioned above, charging can be based on a specified resource. In some such embodiments, the payment authority specifies a required amount of one or more resources, such as processing resources, data transport resources, and wireless resource blocks or frequency bands. The resources can be specified as being required in particular geographic areas and particular time intervals. The MNO provides those specified amounts of resources in the specified areas and time intervals. Charging is based on the amount of provided resources, irrespective of how much of the resources are actually used. However, if the actual demand would result in more than the specified amount of resources being used, the MNO may block certain users or charge additional amounts for excess resource usage.

In various embodiments, as mentioned above, charging can be based on a pay-as-you-go charging model based on aggregated monitoring information. In some such embodiments, UEs with pay-as-you-go arrangements may incur charges based on the amount of traffic usage or amount of resource usage as indicated above. In this case, it may be the aggregated usage across all the UEs belonging to a payment authority that is bulk charged.

In various embodiments, as mentioned above, charging can be based on dynamic charging. In some such embodiments, dynamic charging is similar to pay-as-you-go charging, but charging is changed over time. That is, charging rates differ for different time intervals (or geographic regions) as specified in the SLA. Changes to charging rates may be communicated to UEs and the payment authority.

Figure 13:
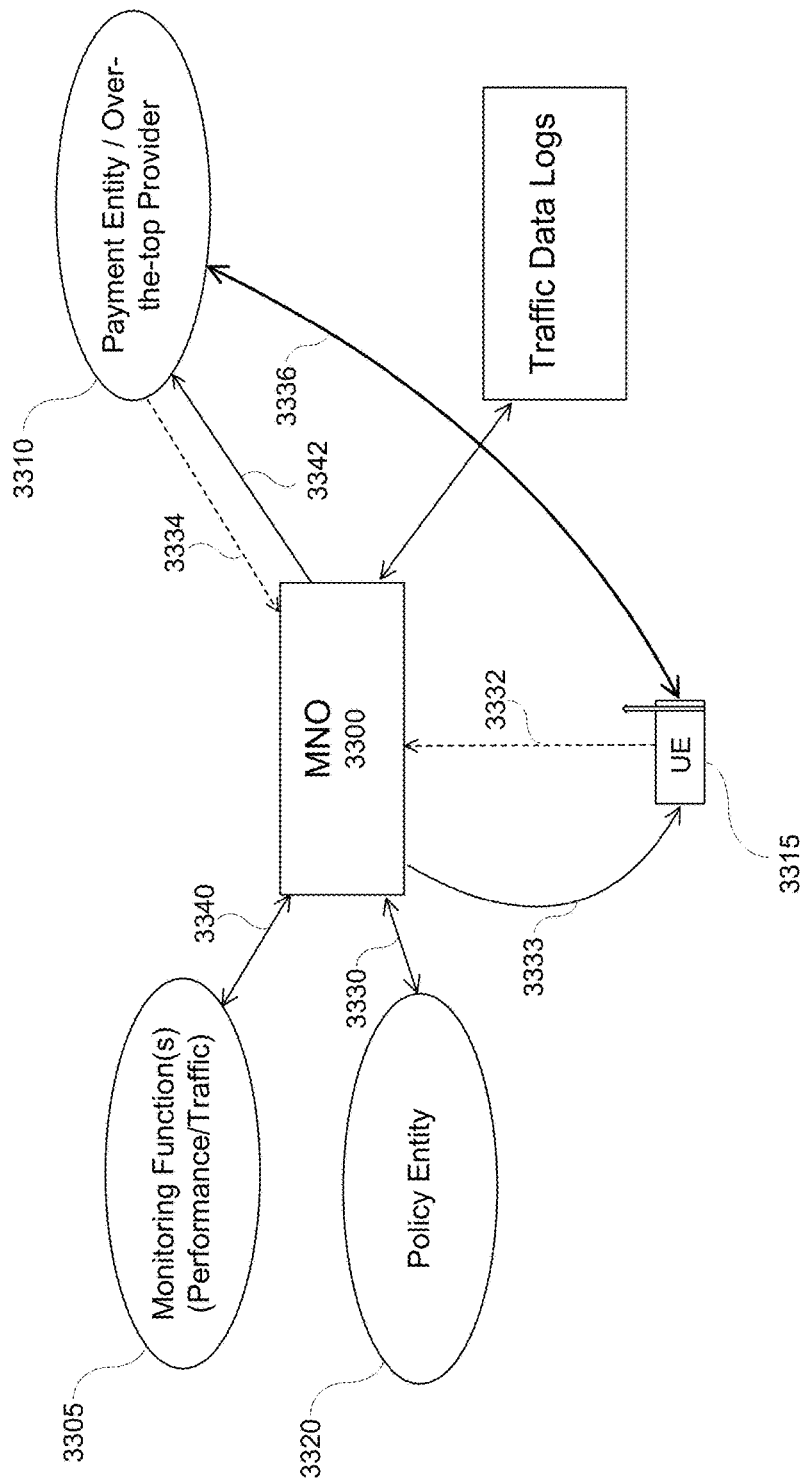
FIG. 13 illustrates interaction between entities including a monitoring function and a designated payment entity, the entity being an over-the-top service provider, according to another embodiment of the present invention.

FIG. 13 illustrates interaction between entities including an MNO 3300, a monitoring function 3305 and a designated payment entity 3310, according to another embodiment of the present invention. The designated payment entity 3310 in this embodiment is an over-the-top service provider. A UE 3315 without a prior subscription obtains access to a service provided or sponsored by the over-the-top service provider, where the over-the-top service provider is charged for the provision of the service rather than the UE (reverse charging).

Initially, the over-the-top service provider 3310 sets up initial access to its server or website. This can proceed for example as described with respect to FIG. 11B. The over-the-top service provider 3310 also sets up rivers charging network slices to facilitate the different services it provides. Example services include but are not limited to video streaming and conference calls. Charging methods and limitations are established by cooperation with the over-the-top service provider 3310. Charging may be on the basis of one or more of: specified demand per geographical area; specified resource; a pay-as-you-go charging model based on aggregated monitoring parameters; and dynamic charging. The monitoring parameters being aggregated can include one or more of: service/flow type and duration; traffic volume (e.g. Bit volume) per service/flow type; resource usage; and number of flow/sessions/per service. Policy establishment 3330, including establishing charging parameters, can accordingly be performed by the MNO 3300 in cooperation with a policy entity 3320.

The MNO 3300 initiates configuration (preparation) of the monitoring function 3105 to perform traffic monitoring, for example including collecting geographic and time information, and including performance monitoring. Performance monitoring can include monitoring for and reporting events such as service non-availability, service drop-out, service blocking, etc. Next, the UE 3315 initiates an attempt to use a service provided by the over-the-top service provider 3310. The attempt can be performed for example according to operations as described in FIG. 11B. This usage requires a communication channel. The UE 3315 accordingly transmits 3332 a request to the MNO 3300 to access the service. Alternatively, the over-the-top service provider 3310 may transmit 3334 the request to the MNO 3300 to access the service. The MNO 3300 checks to see if the service is already configured and accessible.

If the request can be accommodated without exceeding set limitations for providing access to the over-the-top service provider 3310, and optionally if the UE 3315 is not on a black list, then the MNO 3300 provides 3336 access to the over-the-top service and the monitoring function 3305 monitors the traffic flows associated with usage by the UE 3315 of the service. The monitoring may be per-UE monitoring, per-service monitoring, per-priority monitoring, or a combination thereof. Monitored information can include some or all of: service/flow type and duration; traffic volume (e.g. Bit volume) per service/flow type; resource usage; and number of flow/sessions/per service.

Information, for example in the form of network slice usage information, or service or network data, as generated by the monitoring function 3305, is provided 3340 to the MNO 3300. The provision may occur upon completion of the service session, for example. The MNO then generates charging information based on the provided information and transmits 3342 the charges to the designated payment entity (over-the-top service provider) 3310. Such transmission of charges may occur for example if a pay-as-you-go service model is being used. Otherwise, the MNO 3300 may transmit 3342 traffic data to the designated payment entity 3310 for analysis thereby. In some embodiments, the MNO 3300 can transmit bulk charging data to the designated payment entity 3310, for example as agreed in the service level agreement. As mentioned above, bulk charging may be on the basis of one or more of: specified demand per geographical area; specified resource; a pay-as-you-go charging model based on aggregated monitoring parameters; and dynamic charging. The over-the-top service provider may also provide information such as slice usage data.

The call flows for the embodiments of FIGS. 12 and 13 are similar to the call flow illustrated in FIG. 11B.

As mentioned above, provision of the on-demand service can be subject to authentication. In some embodiments, credentials provided by the UE can include an identity of the designated payment entity, and authentication comprises verifying that the designated payment entity is responsible for paying for usage, by the UE, of the on-demand service. Verification can include querying the designated payment entity to confirm it accepts this responsibility.

In various embodiments, a per-pay-per-service model refers to a charging model in which charging rule parameters such as flat rate prices, charging rates, charging dependencies, etc. are implemented on an as-needed basis. The charging rule parameters can be defined at the time that the service is to be delivered.

In various embodiments, on-demand service refers to a service provision model in which a customer, such as a VN operator or end user, does not necessarily have a prior contractual relationship with a service provider, such as an MNO. Instead, parameters of service provision and associated charging are established at the time that the service is requested. That is, a prior SLA is not necessary.

In various embodiments, an on-demand session is a newly initiated session for which the user has not subscribed or for which the user has subscribed as a "pay as you go" type of service. The UE may be a UE which is not subscribed to the MNO or to any VNO that the MNO has a prior SLA with. In addition, a UE involved in an on-demand session can be a UE that is subscribed to a VNO to use a service according to a "pay as you go" service model.

The SONAC is described for example in Zhang, Hang, et al., "5G Wireless Network: MyNET and SONAC", IEEE Network Volume: 29, Issue: 4, July-August 2015, pp 14 to 23, which is incorporated herein by reference.

As described herein, KPIs include both UE KPIs and network (e.g. VN) KPIs. UE KPIs refer to performance indicators for service delivery to a particular UE. Network KPIs on the other hand refer to performance indicators for service delivery to a VN potentially serving multiple UEs. In some embodiments, a network KPI can be based on aggregate statistics of UE KPIs, for UEs served by the network. For example, given a particular UE KPI (such as data rate or percentage of time experiencing service outage), a corresponding network KPI can indicate a statistical distribution of this UE KPI over all UEs served by the network. Alternatively, the network KPI can include a score or value that is correlated with or generated based on such a statistical distribution.

It is noted that, in various embodiments, network KPIs are generated by a service provider by aggregating UE KPIs, for example by aggregating statistics of the UE KPIs, prior to transmitting the network KPI information to a VN operator.

Aggregate SLAs can be configured to benefit from statistical multiplexing gain. Statistical multiplexing gain refers to the gain in efficiency due to sharing of resources across multiple end devices with limited behavioural correlations. Aggregate SLAs therefore allow for some end devices to use resources that are going unused or under-used by other end devices. With large numbers of end devices, variability of aggregate behaviour is also limited. By using an aggregate SLA and plural devices, resource over-use or under-use tends to decrease.

As used herein, the term capability guarantee-based charging refers to a guarantee (or undertaking), provided by the service provider or MNO, to satisfy a set of service delivery parameters. These parameters may correspond to capabilities such as one or more of: link capacity, link delay budgets, service QoS, network KPIs (defined elsewhere), delay guarantee, guarantees regarding outages, etc. A guarantee may be for a fixed value or for a statistical guarantee. For example a statistical guarantee may state that 95% of the time, link capacity will be greater than 5 GB per second. Failing to meet a guarantee may cause penalties to be invoked, as set forth in the SLA.

Various embodiments of the present invention refer to geographical locations, areas, zones, bins, or regions. As mentioned, this can refer to user location, such as a hotspot or remote area. For example, the monitoring function may generate indications of geographic locations of end user devices involved in receiving the service, and charging may be based at least partially on these indications of geographic locations. In more detail, and in some embodiments, such geographical information can be generated and provided on a geographic resolution scale that is on the same order as or finer than the resolution of radio access nodes, or of the service area of a particular access node. For example, geographic bins can be defined as 1 m by 1 m or 10 m by 10 m regions arranged in a grid pattern. As another example, geographic bins can correspond to sectors served by an access node. As yet another example, geographic bins can refer to hotspots or locations proximate to an antenna of a distributed radio access node. As it another example, geographic bins can be based at least in part on UE signal strength. Solving a UE to a particular geographic bin can be performed based on information such as reported GPS position, radio triangulated or trilaterated position, access node association, etc.

In various embodiments, a user-in-the-loop (UIL) approach is implemented in which a VN customer, end user devices, or both, adjust operation based on notifications from another entity in the network, such as an MNO or charging entity. This approach allows for network traffic to be limited or shaped as early as possible, i.e. at the originating devices, rather than allowing the traffic to enter the network at an undesired time. By coordinating UIL across multiple devices or in mobile device, originating traffic may be shaped across both time and space. The charging related messages provided by the customer service management functions can be provided to the customer and can indicate charging rules, such as charging rules that vary over geography, time, or both.

The charging related messages can prompt the customer to adjust their access to the service, for example by adjusting timing of access or adjusting geographic location at which access is made. Adjusting geographic location may be performed by changing which UE performs the access or moving the UE performing the access. The charging related messages can prompt the customer to begin or cease service-related transmission from one or more controlled UEs, adjust traffic prioritizations of service-related messages, renegotiate the SLA, or a combination thereof. Charging related messaging can therefore facilitate a feedback process from the MNO to the VNO, end users, or both. For example, this may cause the VNO to adjust prioritizations of its end user traffic.

In various embodiments, a feedback mechanism is provided and configured to indicate one or more of: violations of QoS metrics applied to data provided according to the service; dynamic variations in a charging policy according to the negotiated agreement; and charging related messages for use in service traffic control or for provision to the customer. The feedback mechanism can involve charging related messages.

Various embodiments of the present invention include providing a charging control function for generating customer charges according to a negotiated agreement and based on monitoring by monitoring functions. Providing the charging control function may include determining a location in the network for the charging control function, and instantiating the charging control function in the determined location. The location may be within a network slice which provides the service.

In some embodiments, the charging control function is configured to generate the customer charges based on one or more of the following indicators: an amount of data provided according to the service; a single or aggregate data rate provided according to the service; a bandwidth used according to the service; geographic locations of one or more end user devices involved in receiving the service; quality of service (QoS) metrics applied to data provided according to the service; a number of identifiable interactions with the service; amount of resources used in providing the service; a number of service sessions provided; satisfaction of key performance indicators described in the negotiated agreement; and times of access to the service. The monitoring function(s) can be configured to monitor operations in the network in order to generate the above indicators.

A monitoring function may be generic or dedicated for monitoring activity corresponding to: the service, a user of the service, or a session of the service.

In some embodiments, the service is provided directly to one or a plurality of end user devices, and the service comprises a single connectivity session provided in response to the service request.

In some embodiments, as will be understood in view of the above, traffic flow monitoring can include monitoring of various aspects and characteristics. Examples of such aspects and characteristics include: a type of service provided using the traffic flows; a duration of service provided using the traffic flows; a traffic flow type; traffic flow duration; a traffic volume per service type; a traffic volume per traffic flow type; network resource usage; number of traffic flows per service; and number of sessions per service. Monitoring can be done on a per-UE basis or on an aggregate basis, or both.

In some embodiments, for example when the designated payment entity is an over-the-top service provider involved in service delivery, the service (e.g. on-demand service) is limited to accessing a service portfolio of the over-the-top service provider. For example, although the UE can be connected to the network for purposes of using the on-demand service, the access is restricted in the sense that only certain functions associated with the service portfolio can be accessed.

It should be understood that, when referring to entities such as an MNO, VNO, designated payment entity, customer entity, etc., some or all actions of these entities may be performed automatically using a corresponding computerized management system. Furthermore, the management systems may receive configuration input from actual human operators, where appropriate, and automatically act on this configuration input in a specified manner. In particular, a policy entity can receive configuration input from a human operator, and act based on the configuration input. Therefore, for example, policy decisions can be made by human operators, who enter the corresponding configuration information into a management system. Negotiations can be performed automatically between management systems, with or without operator input.

It will be readily understood that, throughout the preceding discussion, the above-described network functionalities and operations may correspond to a method for use in supporting operation of a communication network, such as but not limited to a 5th generation wireless communication network. The method may involve computer-implemented functions, namely functions which are implemented by one or more computing, communication and/or memory devices of the network infrastructure. Further, it will be readily understood that embodiments of the present invention relate to a communication network system or associated apparatus thereof, which is configured to perform the above-described network functionalities and operations. Again, the system or apparatus may comprise one or more computing, communication and/or memory devices of the network infrastructure.

Embodiments of the present invention may be implemented using specific servers or general-purpose computing, communication and/or memory devices. Computing devices used to implement method operations may include a processor operatively coupled to memory, the memory providing instructions for execution by the processor to perform the method as described herein. Embodiments of the present invention may be implemented at least in part using computing devices such as Application Specific Integrated Circuits, microcontrollers, and digital logic circuits. Embodiments of the present invention may be directed to improving internal operations of the communication network.

Embodiments of the present invention provide for an apparatus configured to operate as described above. For example, the apparatus may be configured to perform or direct methods as described herein. A system comprising multiple apparatuses is also provided.

FIG. 14 is a block diagram of an electronic device (ED) 2002 illustrated within a computing and communications environment 2000 that may be used for implementing the devices and methods disclosed herein. In some embodiments, the electronic device may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device may be a device that connects to network infrastructure over a radio interface, such as a mobile phone, smart phone or other such device that may be classified as a User Equipment (UE). In some embodiments, ED 2002 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 2002 typically includes a processor 2004, such as a Central Processing Unit (CPU), and may further include specialized processors such as a Graphics Processing Unit (GPU) or other such processor, a memory 2006, a network interface 2008 and a bus 2010 to connect the components of ED 2002. ED 2002 may optionally also include components such as a mass storage device 2012, a video adapter 2014, and an I/O interface 2016 (shown in dashed lines).

The memory 2008 may comprise any type of non-transitory system memory, readable by the processor 2004, such as static random access memory (SRAM), dynamic random access memory (DRAM), synchronous DRAM (SDRAM), read-only memory (ROM), or a combination thereof. In an embodiment, the memory 2008 may include more than one type of memory, such as ROM for use at boot-up, and DRAM for program and data storage for use while executing programs. The bus 2010 may be one or more of any type of several bus architectures including a memory bus or memory controller, a peripheral bus, or a video bus.

The electronic device 2002 may also include one or more network interfaces 2008, which may include at least one of a wired network interface and a wireless network interface. As illustrated in FIG. 12, network interface 2008 may include a wired network interface to connect to a network 2022, and also may include a radio access network interface 2020 for connecting to other devices over a radio link. When ED 2002 is network infrastructure, the radio access network interface 2020 may be omitted for nodes or functions acting as elements of the Core Network (CN) other than those at the radio edge (e.g. an eNB). When ED 2002 is infrastructure at the radio edge of a network, both wired and wireless network interfaces may be included. When ED 2002 is a wirelessly connected device, such as a User Equipment, radio access network interface 2020 may be present and it may be supplemented by other wireless interfaces such as WiFi network interfaces. The network interfaces 2008 allow the electronic device 2002 to communicate with remote entities such as those connected to network 2022.

The mass storage 2012 may comprise any type of non-transitory storage device configured to store data, programs, and other information and to make the data, programs, and other information accessible via the bus 2010. The mass storage 2012 may comprise, for example, one or more of a solid state drive, hard disk drive, a magnetic disk drive, or an optical disk drive. In some embodiments, mass storage 2004 may be remote to the electronic device 2002 and accessible through use of a network interface such as interface 2008. In the illustrated embodiment, mass storage 2012 is distinct from memory 2008 where it is included, and may generally perform storage tasks compatible with higher latency, but may generally provide lesser or no volatility. In some embodiments, mass storage 2012 may be integrated with a heterogeneous memory 2008.

The optional video adapter 2014 and the I/O interface 2016 (shown in dashed lines) provide interfaces to couple the electronic device 2002 to external input and output devices. Examples of input and output devices include a display 2018 coupled to the video adapter 2010 and an I/O device 2017 such as a touch-screen coupled to the I/O interface 2012. Other devices may be coupled to the electronic device 2002, and additional or fewer interfaces may be utilized. For example, a serial interface such as Universal Serial Bus (USB) (not shown) may be used to provide an interface for an external device. Those skilled in the art will appreciate that in embodiments in which ED 2002 is part of a data center, I/O interface 2016 and Video Adapter 2014 may be virtualized and provided through network interface 2008.

In some embodiments, electronic device 2002 may be a standalone device, while in other embodiments, electronic device 2002 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

The apparatus (electronic device) may be dedicated to performing operations according to the present invention as described above, or the apparatus may perform multiple operations including those according to the present invention. The apparatus may be provided using network function virtualization. Depending on its purpose, the apparatus may be instantiated in the core network domain, access network domain, or on a customer-controlled device.

The apparatus may comprise one or a combination of functions as described herein. Such functions can be provided as aspects, features or modules of the apparatus. Functions include a monitoring function, a policy enforcement or policing function, a charging function, a charging control function, a customer service management function, a service function, a traffic alert response function, a resource assignment function, a data collection function, an accounting function, an aggregation function, a dynamic charging handler function, and a supervisory or control function for directing instantiation and configuration of the preceding functions.

Figure 15:
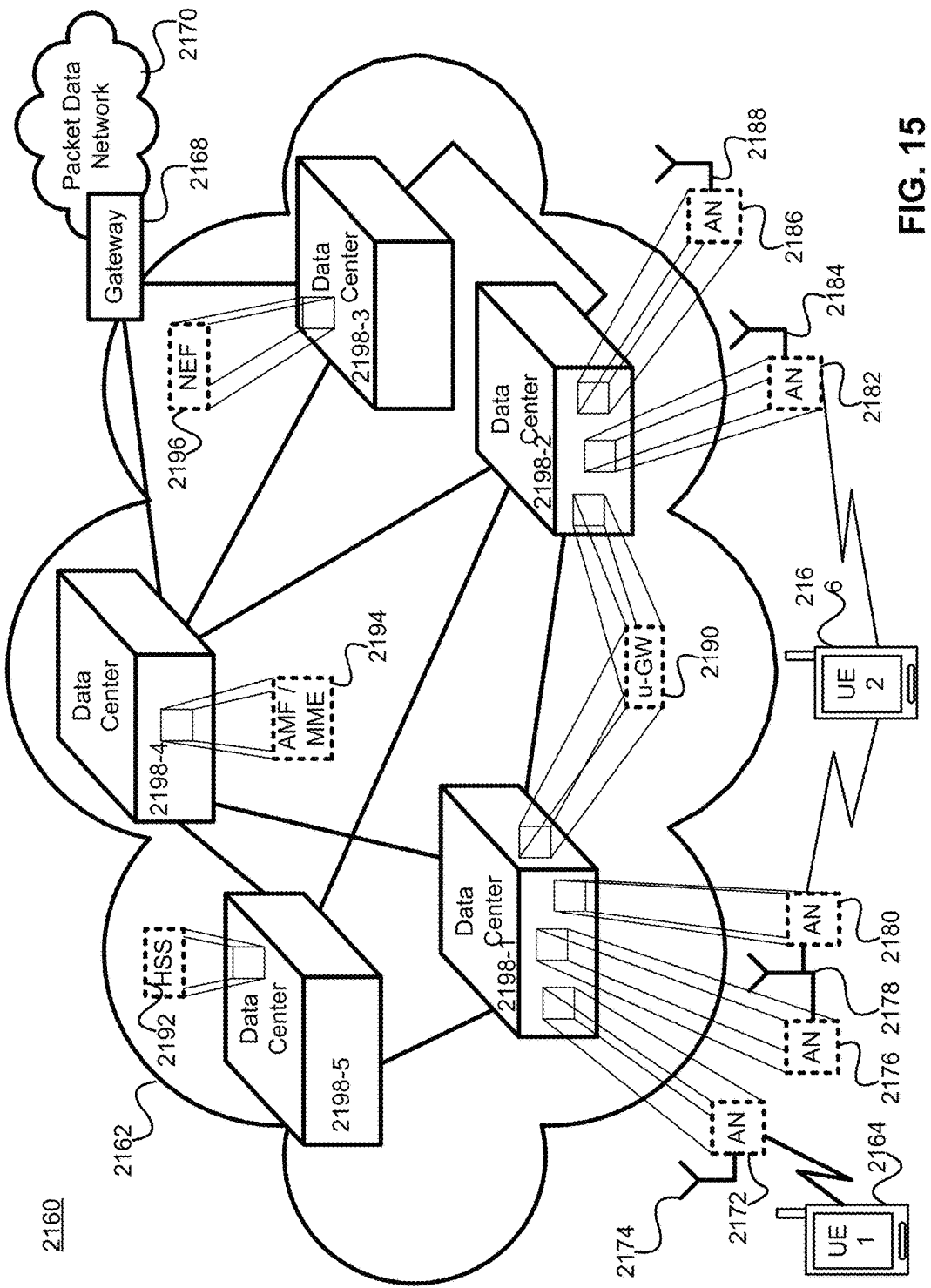
FIG. 15 is a diagram illustrating a cloud-based implementation of a Core Network and Radio Access Network using virtualized functions.

FIG. 15 illustrates a system 2160 in which a core/RAN network 2162 provides radio access and core network services to electronic devices such as UE1 2164 and UE2 2166. Traffic from electronic devices can be routed through network functions, to a gateway 2168 that provides access to a packet data network 2170 such as the Internet. Radio access services are typically provided by a RAN, which in this illustration is provided as a Cloud-RAN (C-RAN). Where a conventional RAN architecture was designed to be composed of discrete elements, such as eNodeBs, that were connected to the Core Network through a backhaul network, a C-RAN takes advantage of function virtualization to virtualize the Access Nodes of the network. Much as a physical Access Node, such as an eNodeB, was connected to an antenna by a front haul link, in the illustrated embodiment of a C-RAN Access Nodes are connected to antenna (or to a remote radio head (RRH)) through a front haul connection, but are functions that are instantiated upon compute resources in network 2162. For example, UE1 2164 is connected to the network through AN 2172, which can provide radio access services through antenna 2174. AN 2172 is instantiated upon the compute and storage resources provided by a data center, in this case data center 2198-1. Similarly, AN 2176 and 2180, which are connected to the same set of antennae 2178, are also instantiated upon the resources of data center 2198-1. AN 2180 provides radio access services to UE 2 2166, which also makes use of the access services provided by AN 2182. AN 2182 is connected to antenna 2184, and is instantiated upon the resources of data center 2198-2. AN 2186 is connected to antenna 2188, and is also instantiated upon the resources of data center 2198-2. It should be understood that the fronthaul connections linking the virtualized access nodes to the antennas or RRHs, may be direct connections, or they may form a fronthaul network. The integration of a CRAN into a core network may obviate or reduce the concerns associated with backhaul connections as the AN functions may be co-located with CN functions. As such, Data Center 2198-1 also serves as a location at which a user-specific gateway function (u-GW) 2190 is instantiated. This function is also instantiated in data center 2198-2. Having a function instantiated at more than one data center may be part of a function migration process in which the function is moved through the network, or one of the instantiations may be an intentionally redundant instantiation. Both functions can be instantiated and configured, with only one of them active at a time, or they may both be active, but only one of them may be transmitting data to the UE. In other embodiments, such as those focussed on Ultra-Reliable connections, such as Ultra-Reliable Low Latency Communications (URLLC), both functions may be active and transmitting data to (or receiving data from) an ED such as UE2 2166. Network functions such as a Home Subscriber Server (HSS) 2192, an Access and Mobility Management Function (AMF) 2194 or its predecessor Mobility Management Entity (MME), and a Network Exposure Function (NEF) 2196 are shown as being instantiated on the resources of Data Center 2198-5, 2198-4 and 2198-3 respectively.

The virtualization of the network functions allows a function to be located in the network at a location topologically close to the demand for the service provided by the function. Thus, AN 2172, which is associated with antenna 2174, can be instantiated upon data center resources at the data center closest to the antenna 2174, in this case data center 2198-1. Functions such as an NEF 2196, which may not need to be close to ANs, may be instantiated further away (in either or both of a topological or physical sense). Thus, NEF 2196 is instantiated at data center 2198-3, and the HSS 2192 and AMF 2194 are instantiated at data centers 2198-5 and 2198-4 respectively, which are topologically closer to the radio edge of the network 2162. In some network implementations, data centers can be arranged hierarchically and different functions can be placed at different levels in the hierarchy.

Referring to FIG. 15, in some embodiments the system 2160 includes network infrastructure devices owned by an MNO, which are configured to support network slices and functionalities offered and provided by a VNO. The UEs 2164, 2166 may be owned and operated by the VNO or by end users.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for collecting network usage information, comprising:

transmitting an instruction to instantiate a monitoring function at a location in a communication network, the location selected to allow monitoring of traffic flows associated with usage, by a UE, of a network slice instantiated in the network, the monitoring function configured to monitor the traffic flows, wherein the UE uses the network slice for accessing a service delivered by an over-the-top service provider via the communication network, the over-the-top service provider separate from both a customer entity responsible for the UE and an operator of the network slice;

establishing an on-demand communication session for the UE using the network slice, the on-demand communication session for delivery of the service from the over-the-top service provider to the UE;

receiving, from the monitoring function, network slice usage information based on the traffic flows; and charging the over-the-top service provider for usage of the network slice for delivery of the service to the UE, based on the network slice usage information for the on-demand communication session.

2. The method of claim 1, wherein the customer entity responsible for the UE does not have a prior contractual relationship with the over-the-top service provider.

3. The method of claim 1, further comprising allowing the UE to access the service based on a predetermined policy and successful authentication of credentials provided by the UE, and blocking the UE from accessing the service otherwise.

4. The method of claim 3, wherein the credentials include an identity of the over-the-top service provider, and wherein said authentication of credentials comprises verifying that the over-the-top service provider is responsible for paying for usage, by the UE, of the service.

5. The method of claim 1, wherein monitoring of the traffic flows comprises monitoring one or more of: type of service provided using the traffic flows; duration of service provided using the traffic flows; traffic flow type; traffic flow duration; traffic volume per service type; traffic volume per traffic flow type; network resource usage; number of traffic flows per service; and number of sessions per service.

6. The method of claim 1, further comprising providing, to an entity responsible for the UE or to the over-the-top service provider, information indicative of charging rates for usage of the service.

7. The method of claim 1, wherein the monitoring function is further configured to monitor performance of a session used for delivering the service to the UE.

8. The method of claim 1, wherein the service is limited to accessing a service portfolio provided by the over-the-top service provider.

9. The method of claim 1, wherein the service includes a connectivity service supporting communication between the UE and the over-the-top service provider.

10. The method of claim 1, further comprising providing a database indicative of services being offered by one or more mobile network operators including an operator of the communication network, one or more service providers providing a set of services including the service, or a combination thereof, the database accessible to end users including an end user responsible for the UE.

11. The method of claim 1, further comprising modifying performance parameters for providing the service according to one or more of: current network conditions; preferences of an end user responsible for the UE; and preferences of the over-the-top service provider.

12. The method of claim 1, wherein providing the service comprises creating an instance of the service, the instance provided using resources of the network slice, and wherein the network slice is a new network slice or an existing network slice.

13. The method of claim 1, further comprising defining a customer service instance descriptor for the service and creating or modifying a network slice descriptor for the network slice, and using the customer service instance descriptor and the network slice descriptor to direct operation of the monitoring function.

14. The method of claim 1, further comprising providing a charging control function for generating charging information based on the network slice usage information and according to a negotiated agreement with the over-the-top service provider.

15. The method of claim 14, wherein providing the charging control function comprises determining a location in the communication network for the charging control function, and instantiating the charging control function in the determined location.

16. The method of claim 15, wherein the location for the charging control function is within the network slice.

17. The method of claim 14, further comprising configuring the charging control function to generate the charging information based on one or more of: an amount of data provided according to the service; a data rate of the service; a bandwidth used for providing the service; geographic locations of the UE; quality of service (QoS) metrics for data provided according to the service; a number of identifiable interactions between the UE and the service; an amount of resources used in providing the service; satisfaction of key performance indicators described in a negotiated agreement for providing the service; and times of access to the service.

18. The method of claim 1, wherein the monitoring function is configured to monitor operations in the communication network and generate one or more of: an amount of data provided according to the service; a data rate of the service; a bandwidth used for providing the service; geographic locations of the UE; quality of service (QoS) metrics for data provided according to the service; a number of identifiable interactions between the UE and the service; an amount of resources used in providing the service; satisfaction of key performance indicators described in a negotiated agreement for providing the service; and times of access to the service.

19. The method of claim 1, further comprising providing a feedback mechanism configured to indicate, to the over-the-top service provider, one or more of: violations of QoS metrics for data provided according to the service; dynamic variations in a charging policy according to a negotiated agreement for providing the service; and charging related messages.

20. The method of claim 1, wherein the service is provided directly to the UE, and the service comprises a single connectivity session provided in response to a request for the service.

21. An electronic device in a network, the electronic device comprising a processor, a network interface and a memory and configured to:
instantiate or operate a monitoring function at a location in a communication network, the location selected to allow monitoring of traffic flows associated with usage, by a UE, of a network slice instantiated in the network, the monitoring function configured to:
monitor the traffic flows, wherein the UE uses the network slice for accessing a service delivered by an over-the-top service provider via the communication network, the over-the-top service provider separate from both a customer entity responsible for the UE and an operator of the network slice, and wherein an on-demand communication session is established for the UE using the network slice, the on-demand communication session for delivery of the service from the over-the-top service provider to the UE;
generate network slice usage information based on the traffic flows; and
charge the over-the-top service provider for usage of the network slice for delivery of the service to the UE, based on the network slice usage information for the on-demand communication session.

22. The method of claim 1, wherein the customer entity responsible for the UE does not have a prior contractual relationship with the operator of the network slice.

* * * * *